(12) United States Patent
Lee et al.

(10) Patent No.: US 12,309,794 B2
(45) Date of Patent: May 20, 2025

(54) METHOD AND APPARATUS FOR TRANSMITTING/RECEIVING WIRELESS SIGNAL IN WIRELESS COMMUNICATION SYSTEM

(71) Applicant: LG Electronics Inc., Seoul (KR)

(72) Inventors: Youngdae Lee, Seoul (KR); Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 437 days.

(21) Appl. No.: 17/578,082

(22) Filed: Jan. 18, 2022

(65) Prior Publication Data

US 2022/0232610 A1   Jul. 21, 2022

(30) Foreign Application Priority Data

Jan. 18, 2021 (KR) .................. 10-2021-0006585

(51) Int. Cl.
*H04H 20/71* (2008.01)
*H04L 1/1812* (2023.01)
*H04L 5/00* (2006.01)
*H04W 72/23* (2023.01)
*H04W 72/30* (2023.01)

(52) U.S. Cl.
CPC .......... *H04W 72/23* (2023.01); *H04L 1/1812* (2013.01); *H04L 5/0055* (2013.01); *H04W 72/30* (2023.01)

(58) Field of Classification Search
CPC . H04W 72/23; H04W 72/30; H04W 72/1273; H04W 72/1268; H04L 1/1812; H04L 5/0055; H04L 1/1854; H04L 1/1864; H04L 5/005; H04L 5/0051; H04L 1/1469; H04L 2001/0093; H04L 5/0044; H04L 5/0053; H04L 1/1861; H04L 1/1822; H04L 1/1896
USPC ....................................... 370/312
See application file for complete search history.

(56) References Cited

U.S. PATENT DOCUMENTS

| | | | |
|---|---|---|---|
| 8,767,651 B2 * | 7/2014 | Aiba ............... | H04W 72/535 370/329 |
| 9,179,452 B2 * | 11/2015 | Park ................. | H04L 5/001 |
| 9,288,786 B2 * | 3/2016 | Morioka ............ | H04W 4/06 |
| 9,585,122 B2 * | 2/2017 | Morioka ............ | H04W 4/06 |

(Continued)

FOREIGN PATENT DOCUMENTS

| KR | 10-2016-0005327 | 1/2016 |
|---|---|---|
| KR | 10-2019-0104985 | 9/2019 |

OTHER PUBLICATIONS

3GPP, "3rd Generation Partnership Project; Technical Specification Group Radio Access Network; NR; Physical layer procedures for control (Release 16)," 3GPP TS 38.213 V16.4.0, Dec. 2020, 181 pages.

(Continued)

*Primary Examiner* — Amancio Gonzalez
(74) *Attorney, Agent, or Firm* — Fish & Richardson P.C.

(57) ABSTRACT

According to an embodiment of the present disclosure, a user equipment (UE) may receive a multicast physical downlink shared channel (PDSCH) scheduled by first downlink control information (DCI), receive a unicast PDSCH scheduled by the second DCI, and transmit a single uplink signal on which HARQ feedback information on each of the multicast PDSCH and the unicast PDSCH is multiplexed.

15 Claims, 13 Drawing Sheets

(56) References Cited

U.S. PATENT DOCUMENTS

| | | | | |
|---|---|---|---|---|
| 10,200,972 | B2* | 2/2019 | Morioka | H04L 1/1887 |
| 10,652,857 | B2* | 5/2020 | Morioka | H04L 5/0092 |
| 11,296,827 | B2* | 4/2022 | Yang | H04L 1/1607 |
| 11,799,596 | B2* | 10/2023 | Zhou | H04W 72/23 |
| 11,817,960 | B2* | 11/2023 | Zhou | H04W 72/30 |
| 11,902,974 | B2* | 2/2024 | Lee | H04L 1/1864 |
| 2012/0195265 | A1* | 8/2012 | Kim | H04L 1/1861 |
| | | | | 370/328 |
| 2014/0161016 | A1* | 6/2014 | Morioka | H04L 1/1887 |
| | | | | 370/312 |
| 2017/0164329 | A1* | 6/2017 | Morioka | H04W 72/30 |
| 2019/0132104 | A1 | 5/2019 | Lee et al. | |
| 2019/0159173 | A1* | 5/2019 | Morioka | H04W 4/06 |
| 2020/0389878 | A1 | 12/2020 | Karaki et al. | |
| 2021/0243782 | A1* | 8/2021 | Miao | H04L 5/0091 |
| 2021/0377767 | A1* | 12/2021 | Hosseini | H04W 24/10 |
| 2022/0039140 | A1* | 2/2022 | Yi | H04L 1/08 |
| 2022/0046684 | A1* | 2/2022 | Rico Alvarino | H04L 1/1861 |
| 2022/0264612 | A1* | 8/2022 | Yang | H04L 5/0053 |
| 2023/0049911 | A1* | 2/2023 | Hu | H04L 12/1868 |
| 2023/0118689 | A1* | 4/2023 | Matsumura | H04L 5/0055 |
| | | | | 370/329 |
| 2023/0124015 | A1* | 4/2023 | Matsumura | H04L 1/1864 |
| | | | | 370/329 |
| 2023/0133369 | A1* | 5/2023 | Matsumura | H04L 5/0055 |
| | | | | 370/329 |
| 2023/0209313 | A1* | 6/2023 | Chin | H04W 4/06 |
| | | | | 370/329 |
| 2023/0232430 | A1* | 7/2023 | Zhou | H04L 1/1861 |
| | | | | 370/312 |
| 2023/0354370 | A1* | 11/2023 | Yang | H04W 72/1273 |
| 2024/0057088 | A1* | 2/2024 | Matsumura | H04L 1/1812 |

OTHER PUBLICATIONS

CMCC, "FL summary on NR Multicast and Broadcast Services," R1-2007001, Presented at 3GPP TSG RAN WG1 #102-e, e-Meeting, Aug. 17-28, 2020, 17 pages.

Huawei, "FL summary on improving reliability for MBS for RRC_Connected UEs," R1-2009464, Presented at 3GPP TSG RAN WG1 Meeting #103-e, E-meeting, Oct. 26-Nov. 13, 2020, 25 pages.

International Search Report in International Appln. No. PCT/KR2022/000816, dated May 4, 2022, 8 pages (with English translation).

Huawei, HiSilicon, "Remaining issues on scheduling and HARQ," 3GPP TSG RAN WG1, Meeting #92bis, R1-1804431, Sanya, China, Apr. 16-20, 2018, 16 pages.

Notice of Allowance in Korean Appln. No. 10-2022-7037179, mailed on Feb. 21, 2024, 5 pages (with English Translation).

* cited by examiner

FIG. 9

| R | Serving Cell ID | | | | | BWP ID | | Oct 1 |
|---|---|---|---|---|---|---|---|---|
| R | PUCCH Resource ID | | | | | | | Oct 2 |
| $S_7$ | $S_6$ | $S_5$ | $S_4$ | $S_3$ | $S_2$ | $S_1$ | $S_0$ | Oct 3 |

METHOD AND APPARATUS FOR TRANSMITTING/RECEIVING WIRELESS SIGNAL IN WIRELESS COMMUNICATION SYSTEM

CROSS-REFERENCE TO RELATED APPLICATIONS

This application claims the benefit of Korean Application No. 10-2021-0006585, filed on Jan. 18, 2021, which is hereby incorporated by reference as if fully set forth herein.

TECHNICAL FIELD

The present disclosure relates to a wireless communication system, and more particularly, to a method and apparatus for transmitting/receiving a wireless signal.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

In an aspect of the present disclosure, there is provided a method of transmitting hybrid automatic repeat request (HARQ) feedback information by a user equipment (UE) in a wireless communication system. The method may include: receiving a plurality of physical downlink control channels (PDCCHs), each carrying downlink control information (DCI); receiving a plurality of physical downlink shared channels (PDSCHs) based on the plurality of PDCCHs; and transmitting a single uplink signal by multiplexing thereon HARQ feedback information for each of the plurality of PDSCHs. Receiving the plurality of PDCCHs may include receiving a first PDCCH carrying first DCI for multicast scheduling and receiving a second PDCCH carrying second DCI for unicast scheduling. Receiving the plurality of PDSCHs may include receiving a multicast PDSCH scheduled by the first DCI and receiving a unicast PDSCH scheduled by the second DCI. For the multicast PDSCH, the UE may be configured with either one of a first mode for reporting acknowledgement/negative-acknowledgement (ACK/NACK) or a second mode for reporting NACK only.

Based on that first HARQ feedback information for the multicast PDSCH is to be multiplexed with second HARQ feedback information for the unicast PDSCH in a state in which the UE is configured with the second mode for the multicast PDSCH, the UE may be configured to: generate the first HARQ feedback information based on the first mode other than the second mode configured in the UE; and multiplex the first HARQ feedback information generated based on the first mode, with the second HARQ feedback information.

In the second mode, reporting of HARQ feedback information consisting of ACKs without any NACK may be skipped.

The single uplink signal may be a physical uplink control channel (PUCCH).

The UE may be configured to receive configuration information indicating the second mode among the first mode and the second mode for the multicast PDSCH.

A cyclic redundancy check (CRC) of the first PDCCH carrying the first DCI may be scrambled with a group radio network temporary identifier (G-RNTI).

The plurality of PDSCHs may include a third PDCCH carrying third DCI for unicast scheduling.

Based on that a priority related to the first HARQ feedback information indicated by the first DCI is higher than a priority related to third HARQ feedback information indicated by the third DCI, the UE may be configured to drop the third HARQ feedback information related to the unicast scheduling and transmit the first HARQ feedback information.

Based on that the first HARQ feedback information for the multicast PDSCH is multiplexed with ACK/NACK-based fourth HARQ feedback information in a state in which the UE is configured with the second mode, the UE may be configured to: generate the first HARQ feedback information based on the first mode other than the second mode configured in the UE; and multiplex the first HARQ feedback information generated based on the first mode with the fourth HARQ feedback information. The fourth HARQ feedback information may be for another multicast PDSCH other than the multicast PDSCH. The first mode may be configured for the other multicast PDSCH.

In another aspect of the present disclosure, there is provided a computer-readable storage medium having stored thereon a program for executing the above-described method.

In another aspect of the present disclosure, there is provided a UE configured to perform the method.

In another aspect of the present disclosure, there is provided a device configured to control the UE configured to perform the method.

In another aspect of the present disclosure, there is provided a method of receiving HARQ feedback information by a base station (BS) in a wireless communication system. The method may include: transmitting a plurality of PDCCHs, each carrying DCI; transmitting a plurality of PDSCHs based on the plurality of PDCCHs; and receiving from a UE a single uplink signal on which HARQ feedback information for each of the plurality of PDSCHs is multiplexed. Transmitting the plurality of PDCCHs may include transmitting a first PDCCH carrying first DCI for multicast scheduling and transmitting a second PDCCH carrying second DCI for unicast scheduling. Transmitting the plurality of PDSCHs may include transmitting a multicast PDSCH scheduled by the first DCI and transmitting a unicast PDSCH scheduled by the second DCI. For the multicast PDSCH, the BS may be configured to configure either one of a first mode for receiving a ACK/NACK or a second mode for receiving only a NACK. Based on that first HARQ feedback information for the multicast PDSCH is to be multiplexed with second HARQ feedback information for the unicast PDSCH in a state in which the UE is configured with the second mode for the multicast PDSCH, the BS may be configured to obtain the first HARQ feedback information and the second HARQ feedback information by assuming that the first HARQ feedback information is multiplexed with the second HARQ feedback information based on the first mode other than the second mode configured in the UE.

In another aspect of the present disclosure, there is provided a BS configured to perform the method.

According to an embodiment of the present disclosure, multiplexing of uplink control information (UCI) including multicast broadcast service (MBS) related hybrid automatic repeat request (HARM) feedback may be defined, thereby avoiding ambiguity in MBS related feedback transmission or misalignment between a user equipment (UE) and a base station (BS).

It will be appreciated by persons skilled in the art that the effects that could be achieved with the present disclosure are not limited to what has been particularly described hereinabove and other advantages of the present disclosure will be more clearly understood from the following detailed description.

BRIEF DESCRIPTION OF THE DRAWINGS

FIG. 9 illustrates a medium access control (MAC) control element (CE) for activation/deactivation of multicast broadcast service (MBS) related physical uplink control channel (PUCCH) spatial relation according to an embodiment of the present disclosure;

DETAILED DESCRIPTION

Figure 1:
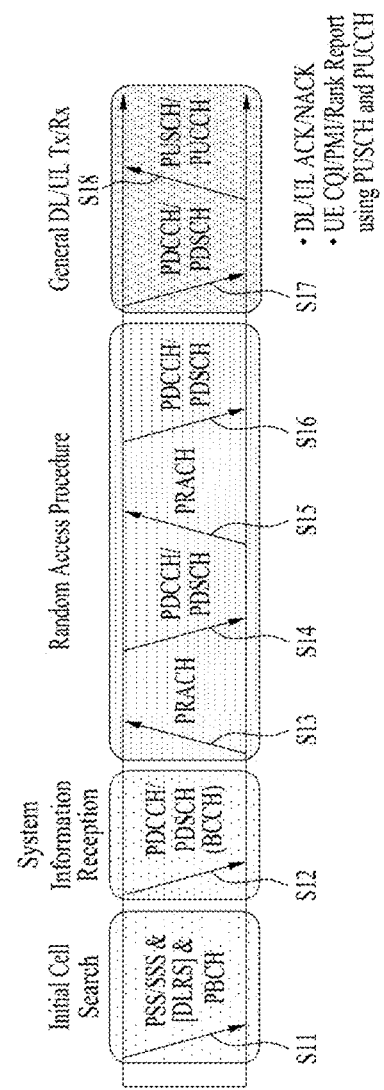
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/user equipments (UEs) sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

Details of the background, terminology, abbreviations, etc. used herein may be found in following documents.

3GPP LTE
  TS 36.211: Physical channels and modulation
  TS 36.212: Multiplexing and channel coding
  TS 36.213: Physical layer procedures
  TS 36.300: Overall description
  TS 36.321: Medium Access Control (MAC)
  TS 36.331: Radio Resource Control (RRC)
3GPP NR
  TS 38.211: Physical channels and modulation
  TS 38.212: Multiplexing and channel coding
  TS 38.213: Physical layer procedures for control
  TS 38.214: Physical layer procedures for data
  TS 38.300: NR and NG-RAN Overall Description
  TS 38.321: Medium Access Control (MAC)
  TS 38.331: Radio Resource Control (RRC) protocol specification
Abbreviations and Terms
  PDCCH: Physical Downlink Control CHannel
  PDSCH: Physical Downlink Shared CHannel
  PUSCH: Physical Uplink Shared CHannel
  CSI: Channel state information
  RRM: Radio resource management
  RLM: Radio link monitoring
  DCI: Downlink Control Information
  CAP: Channel Access Procedure
  Ucell: Unlicensed cell
  PCell: Primary Cell
  PSCell: Primary SCG Cell TBS: Transport Block Size
SLIV: Starting and Length Indicator Value
BWP: BandWidth Part
CORESET: COntrol REsourse SET
REG: Resource element group
SFI: Slot Format Indicator
COT: Channel occupancy time
SPS: Semi-persistent scheduling
PLMN ID: Public Land Mobile Network identifier
RACH: Random Access Channel
RAR: Random Access Response
MBMS: Multimedia Broadcast/Multicast Service
Msg3: Message transmitted on UL-SCH containing a C-RNTI MAC CE or CCCH SDU, submitted from upper layer and associated with the UE Contention Resolution Identity, as part of a Random Access procedure.
Special Cell: For Dual Connectivity operation the term Special Cell refers to the PCell of the MCG or the PSCell of the SCG depending on if the MAC entity is associated with the MCG or the SCG, respectively. Otherwise the term Special Cell refers to the PCell. A Special Cell supports PUCCH transmission and contention-based Random Access, and is always activated.
Serving Cell: A PCell, a PSCell, or an SCell
MBSFN Synchronization Area: (In the case of an LTE network), the term MBSFN Synchronization Area refers to a network area where all base stations are capable of being synchronized and performing MBSFN transmission. The MBSFN synchronization area may support one or more MBSFN areas. On a given frequency, an eNodeB may only belong to one MBSFN synchronization area. MBSFN synchronization areas are defined independently of MBMS service areas.
MBSFN Transmission or a transmission in MBSFN mode: The term MBSFN Transmission refers to a simultaneous broadcast technique in which multiple cells transmit the same waveform at the same time. An MBSFN transmission from multiple cells within an MBSFN area is considered a single transmission by a UE.
MBSFN Area: The MBSFN area consists of a group of cells within an MBSFN synchronization area, which cooperate for MBSFN. Except for reserved cells in the MBSFN area, all cells participate in the MBSFN Transmission and advertise their MBMSN availability. The UE only needs to consider a subset of configured MB SFN areas (i.e., services of interest).

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
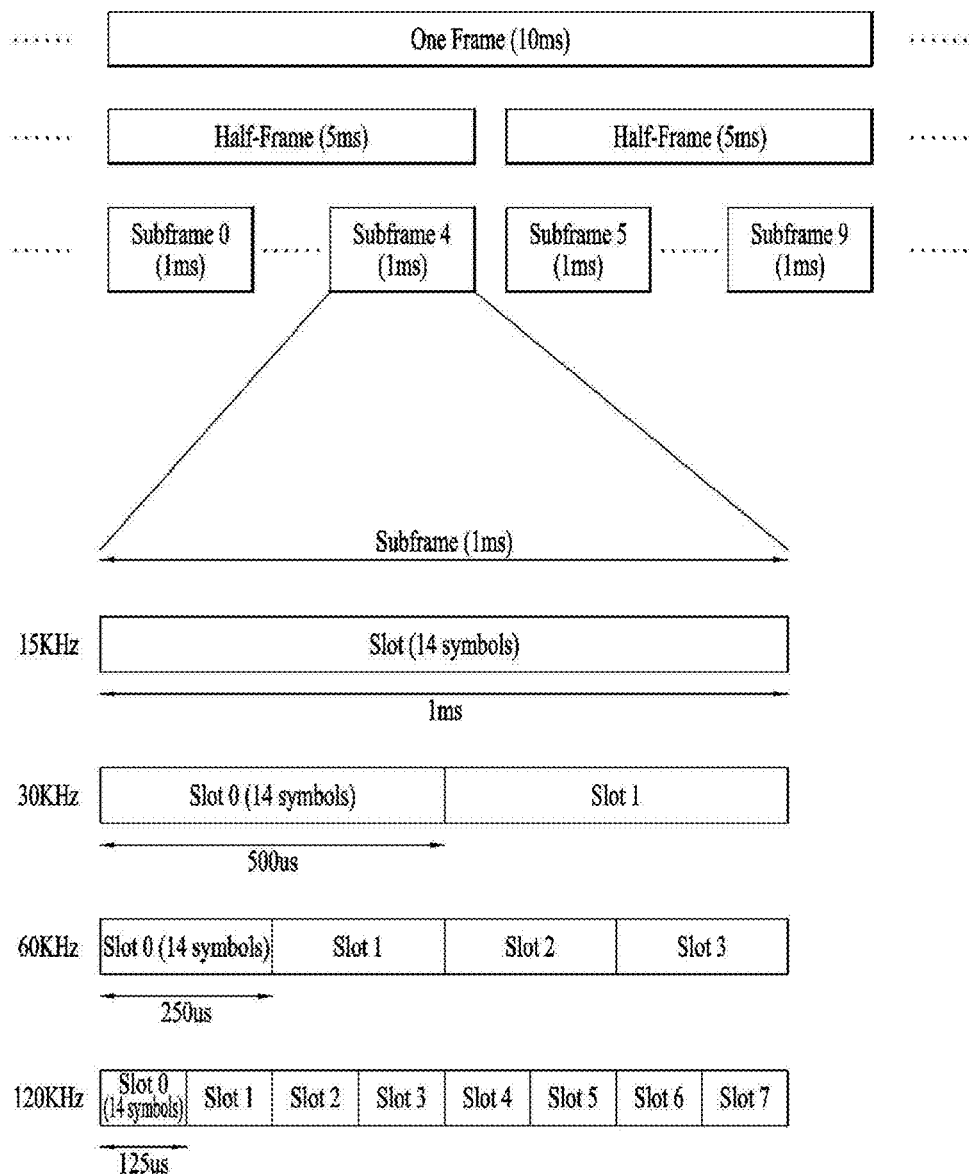
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15*2^u) | $N^{slot}_{symb}$ | $N^{frame, u}_{slot}$ | $N^{subframe, u}_{slot}$ |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

$N^{slot}_{symb}$: Number of symbols in a slot
$N^{frame, u}_{slot}$: Number of slots in a frame
$N^{subframe, u}_{slot}$: Number of slots in a subframe Table 2 illustrates that the number of symbols per slot, the number of slots per frame, and the number of slots per subframe vary according to the SCS when the extended CP is used.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
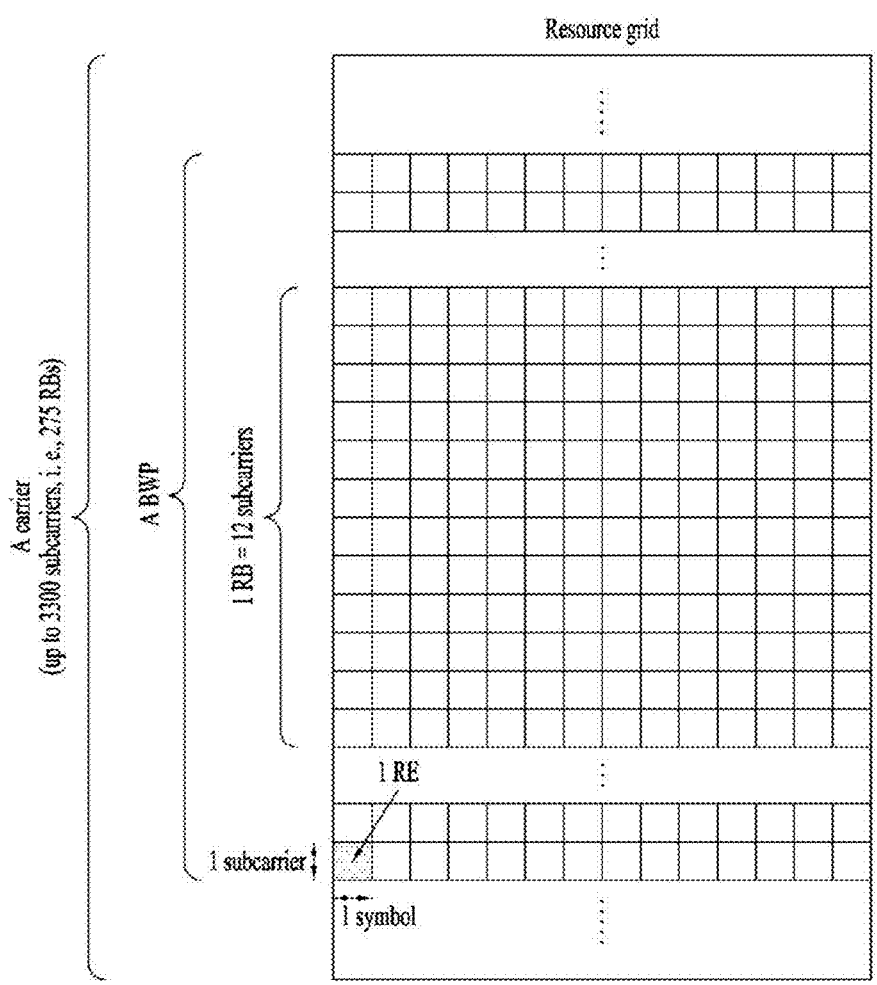
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
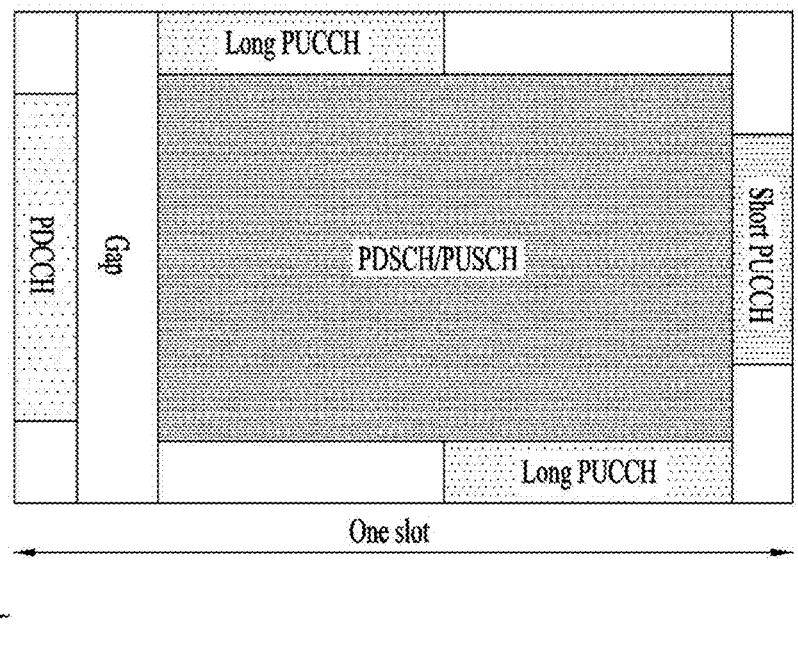
FIG. 4 illustrates exemplary mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g., a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

A BS may transmit a control resource set (CORESET) configuration to a UE. A CORSET is defined as a resource element group (REG) set having a given numerology (e.g., an SCS, a CP length, and so on). An REG is defined as one OFDM symbol by one (P)RB. A plurality of CORESETs for one UE may overlap with each other in the time/frequency domain. A CORSET may be configured by system information (e.g., a master information block (MIB)) or higher-layer signaling (e.g., radio resource control (RRC) signaling). For example, configuration information about a specific common CORSET (e.g., CORESET #0) may be transmitted in an MIB. For example, a PDSCH carrying system information block 1 (SIB1) may be scheduled by a specific PDCCH, and CORSET #0 may be used to carry the specific PDCCH. Configuration information about CORESET #N (e.g., N>0) may be transmitted by RRC signaling (e.g., cell-common RRC signaling or UE-specific RRC signaling). For example, the UE-specific RRC signaling carrying the CORSET configuration information may include various types of signaling such as an RRC setup message, an RRC reconfiguration message, and/or BWP configuration information. Specifically, a CORSET configuration may include the following information/fields.

controlResourceSetId: indicates the ID of a CORESET.

frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.

duration: indicates the time resources of the CORESET. Duration indicates the number of consecutive OFDM symbols included in the CORESET. Duration has a value of 1 to 3.

cce-REG-MappingType: indicates a control channel element (CCE)-REG mapping type. Interleaved and non-interleaved types are supported.

interleaverSize: indicates an interleaver size.

pdcch-DMRS-ScramblingID: indicates a value used for PDCCH DMRS initialization.

When pdcch-DMRS-ScramblingID is not included, the physical cell ID of a serving cell is used.

precoderGranularity: indicates a precoder granularity in the frequency domain.

reg-BundleSize: indicates an REG bundle size.

tci-PresentInDCI: indicates whether a transmission configuration index (TCI) field is included in DL-related DCI.

tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE. The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a USS set or a CSS set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: indicates the ID of an SS.
controlResourceSetId: indicates a CORESET associated with the SS.
monitoringSlotPeriodicityAndOffset: indicates a periodicity (in slots) and offset (in slots) for PDCCH monitoring.
monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.
nrofCandidates: indicates the number of PDCCH candidates (one of values 0, 1, 2, 3, 4, 5, 6, and 8) for each AL where AL={1, 2, 4, 8, 16}.
searchSpaceType: indicates common search space (CSS) or UE-specific search space (USS) as well as a DCI format used in the corresponding SS type.

Subsequently, the BS may generate a PDCCH and transmit the PDCCH to the UE, and the UE may monitor PDCCH candidates in one or more SSs to receive/detect the PDCCH. An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |

TABLE 3-continued

| Type | Search Space | RNTI | Use Case |
|---|---|---|---|
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0-1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

PDSCH carries downlink data (e.g., DL-SCH transport block, DL-SCH TB). The modulation scheme such as Quadrature Phase Shift Keying (QPSK), 16 Quadrature Amplitude Modulation (QAM), 64 QAM, or 256 QAM is applied to the PDSCH. A codeword is generated by encoding the TB. The PDSCH can carry up to two codewords. Scrambling and modulation mapping are performed for each codeword, and modulation symbols generated from each codeword may be mapped to one or more layers. Each layer is mapped to resources along with a demodulation reference signal (DMRS), is generated as an OFDM symbol signal, and is transmitted through a corresponding antenna port.

PUCCH carries Uplink Control Information (UCI). UCI may include one or more of following information:

SR (Scheduling Request): Information used to request a UL-SCH resource.

HARQ (Hybrid Automatic Repeat reQuest)-ACK (Acknowledgment): It is a response to a downlink data packet (e.g., codeword) on the PDSCH, and indicates whether the downlink data packet has been successfully received. 1 bit of HARQ-ACK may be transmitted in response to a single codeword, and 2 bits of HARQ-ACK may be transmitted in response to two codewords. The HARQ-ACK response includes positive ACK (simply, ACK), negative ACK (NACK), DTX or NACK/DTX. Here, HARQ-ACK may be called as HARQ ACK/NACK and ACK/NACK.

CSI (Channel State Information): feedback information for a downlink channel. Multiple Input Multiple Output (MIMO)-related feedback information includes a Rank Indicator (RI) and a Precoding Matrix Indicator (PMI).

Table 5 shows PUCCH formats. According to PUCCH length, PUCCH formats can be classified as Short PUCCH (format 0, 2) and Long PUCCH (format 1, 3, 4).

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 carries UCI having a maximum size of 2 bits, and is mapped and transmitted based on a sequence. Specifically, the UE transmits a specific UCI to the base station by transmitting one of the plurality of sequences through the PUCCH having the PUCCH format 0. The UE transmits a PUCCH format 0 within a PUCCH resource for configuring a corresponding SR only when transmitting a positive SR.

PUCCH format 1 carries UCI with a maximum size of 2 bits, and a modulation symbol is spread by an orthogonal cover code (OCC) (configured differently depending on whether frequency hopping is performed) in the time domain. DMRS is transmitted in a symbol in which a modulation symbol is not transmitted (i.e., time division multiplexing (TDM) is performed).

PUCCH format 2 carries UCI having a bit size greater than 2 bits, and a modulation symbol is transmitted with DMRS based on frequency division multiplexing (FDM). DM-RS is located at symbol indexes #1, #4, #7, and #10 in a given resource block with a density of ⅓. A Pseudo Noise (PN) sequence is used for the DM_RS sequence. For 2-symbol PUCCH format 2, frequency hopping may be enabled.

For PUCCH format 3, UE multiplexing is not performed in the same physical resource blocks, and the PUCCH format 3 carries UCI having a bit size greater than 2 bits. PUCCH resource of PUCCH format 3 does not include an orthogonal cover code. The modulation symbol is transmitted with the DMRS based on time division multiplexing (TDM).

For PUCCH format 4, UE multiplexing is supported for up to 4 UEs in the same physical resource blocks, and the PUCCH format 4 carries UCI having a bit size greater than 2 bits. PUCCH resource of PUCCH format 3 includes an orthogonal cover code. The modulation symbol is transmitted with DMRS based on time division multiplexing (TDM).

The following documents may be referred to as 3GPP Technical Specifications related to PUCCH (incorporated by reference).

| | |
|---|---|
| UCI generation | [TS 38.212] subclause 6.3 |
| PUCCH format | [TS 38.211] subclause 6.3.2 |
| PUCCH baseband sequence generation | [TS 38.211] subclause 5.2.2.2 |
| PUCCH resource set | [TS 38.213] subclause 9.2.1 |
| PUCCH RRC | [TS 38.331] subclause 6.3.2 |
| UCI encoding (UCI >= 12) | [TS 38.212] subclause 6.3.1.2.1 |
| UCI encoding (UCI <= 11) | [TS 38.212] subclause 6.3.1.2.2 |
| PUCCH repetition | [TS 38.213] subclause 9.2.6 |

PUSCH carries uplink data (e.g., UL-SCH transport block, UL-SCH TB) and/or uplink control information (UCI). PUCCH is transmitted based on a CP-OFDM (Cyclic Prefix-Orthogonal Frequency Division Multiplexing) waveform or a Discrete Fourier Transform-spread-Orthogonal Frequency Division Multiplexing (DFT-s-OFDM) waveform. When the PUSCH is transmitted based on the DFT-s-OFDM waveform, the UE performs transform precoding for the PUSCH. For example, if transform precoding is not performed (e.g., transform precoding is disabled), the UE transmits a PUSCH based on the CP-OFDM waveform. If transform precoding is performed (e.g., transform precoding is enabled), the UE transmits the PUSCH based on a CP-OFDM waveform or a DFT-s-OFDM waveform. PUSCH transmission is dynamically scheduled by a UL grant in DCI (e.g., Layer 1 (PDCCH) signaling), and/or semi-statically scheduled based on higher layer (e.g., RRC) signaling (configured grant). PUSCH transmission may be performed on a codebook-based or non-codebook-based basis.

Figure 5:
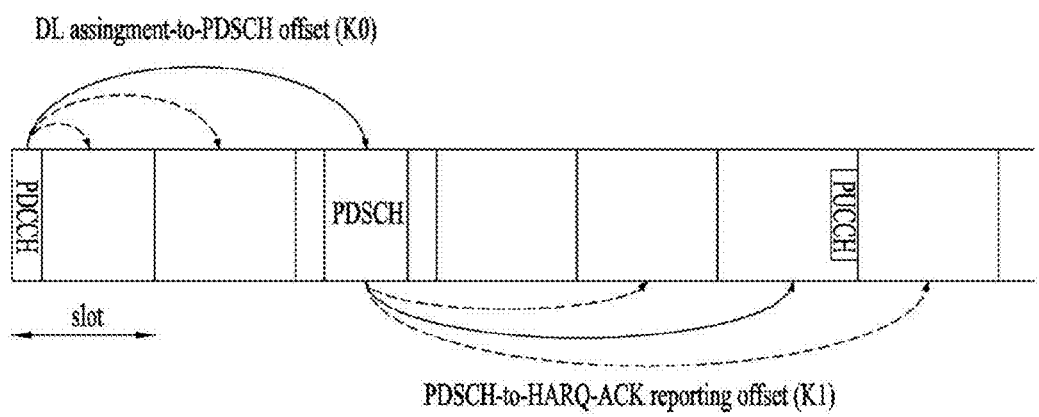
FIG. 5 illustrates an example of a physical downlink shared channel (PDSCH) transmission/reception procedure.

FIG. 5 illustrates an example of a PDSCH transmission/reception procedure. Referring to FIG. 5, the UE may detect the PDCCH in slot #n. Here, the PDCCH includes downlink scheduling information (e.g., DCI formats 1_0, 1_1), and the PDCCH indicates a DL assignment-to-PDSCH offset (K0) and a PDSCH-HARQ-ACK reporting offset (K1). For example, DCI formats 1_0 and 1_1 may include the following information:

Frequency domain resource assignment (FDRA): FDRA indicates the RB set allocated to the PDSCH.

Time domain resource assignment (TDRA): TDRA indicates K0 (e.g., slot offset), the starting position (e.g., OFDM symbol index) of the PDSCH within slot #n+K0, and the length of the PDSCH (e.g., the number of OFDM symbols).

PDSCH-to-HARQ feedback timing indicator, which indicates K1 (e.g., slot offset)

HARQ process number (4 bits), which indicates the HARQ process ID (Identity) for data (e.g., PDSCH, TB)

PUCCH resource indicator (PM): PRI indicates a PUCCH resource to be used for UCI transmission among a plurality of PUCCH resources in the PUCCH resource set The UE receives the PDSCH in slot #(n+K0) based on the scheduling information received in slot #n. After completion of the PDSCH reception in slot #n1 (where, n+K0≤n1), the UE may transmit UCI through PUCCH from slot #(n1+K1). Here, the UCI may include a HARQ-ACK response for the PDSCH. In FIG. 5, for convenience, it is assumed that the SCS for the PDSCH and the SCS for the PUCCH are the same, and it is assumed that slot # n1=slot # n+K0, but the present disclosure is not limited thereto. If the SCSs are different, K1 may be indicated/interpreted based on the SCS of the PUCCH.

If the PDSCH is configured to carry a maximum of 1 TB, the HARQ-ACK response may have 1-bit. When the PDSCH is configured to carry a maximum of 2 TBs, the HARQ-ACK response may be configured with 2-bits when spatial bundling is not configured, and may be configured with 1-bits when spatial bundling is configured. When the HARQ-ACK transmission time for the plurality of PDSCHs is configured as slot #(n+K1), the UCI transmitted in the slot #(n+K1) includes HARQ-ACK responses for the plurality of PDSCHs.

Whether the UE should perform spatial bundling for the HARQ-ACK response may be configured for each cell group (e.g., RRC/higher layer signaling). As an example, spatial bundling may be individually configured in each of the HARQ-ACK response transmitted through the PUCCH and/or the HARQ-ACK response transmitted through the PUSCH.

Spatial bundling may be supported when the maximum number of TBs (or codewords) that can be received at one time in the corresponding serving cell (or schedulable through 1 DCI) is two (or two or more) (e.g., higher layer parameter maxNrofCodeWordsScheduledByDCI is equal to 2-TB). Meanwhile, a number of layers greater than four may be used for 2-TB transmission, and a maximum of four layers may be used for 1-TB transmission. As a result, when spatial bundling is configured in a corresponding cell group, spatial bundling may be performed on a serving cell that can schedule more than four layers among serving cells in the corresponding cell group. On a corresponding serving cell, a UE desiring to transmit a HARQ-ACK response through spatial bundling may generate a HARQ-ACK response by performing (bit-wise) logical AND operation on ACK/NACK (A/N) bits for a plurality of TB s.

For example, assuming that the UE receives DCI for scheduling 2-TB and receives 2-TB through the PDSCH based on the DCI. If spatial bundling is performed, a single A/N bit may be generated by performing a logical AND operation on the first A/N bit for the first TB and the second A/N bit for the second TB. As a result, if both the first TB and the second TB are ACKs, the UE reports the ACK bit value to the BS, and when either TB is NACK, the UE reports the NACK bit value to the BS.

For example, when only a 1-TB is actually scheduled on a serving cell in which 2-TB reception is allowed, the UE may generate a single A/N bit by performing a logical AND operation on the A/N bit for the corresponding 1-TB and a bit value of 1. As a result, the UE may report the A/N bit for the corresponding 1-TB to the BS as it is.

A plurality of parallel DL HARQ processes can be configured for DL transmission in the base station/terminal. A plurality of parallel HARQ processes allow DL transmissions to be performed continuously while waiting for HARQ feedback on successful or unsuccessful reception of the previous DL transmission. Each HARQ process is associated with a HARQ buffer of a MAC (Medium Access Control) layer. Each DL HARQ process manages information related to the number of MAC PDU (Physical Data Block) transmissions in the buffer, HARQ feedback for the MAC PDU in the buffer, and a current redundancy version. Each HARQ process is identified by a HARQ process ID.

Figure 6:
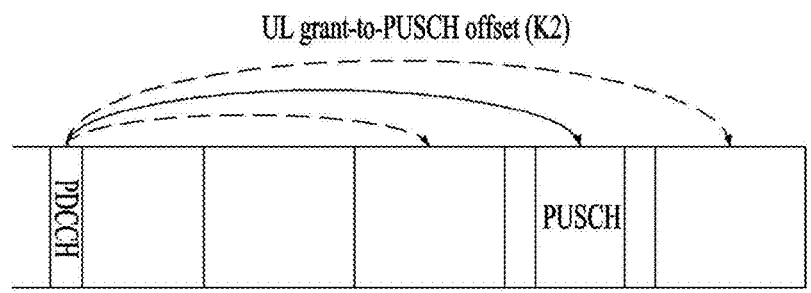
FIG. 6 illustrates an example of a physical uplink shared channel (PUSCH) transmission/reception procedure.

FIG. 6 illustrates an example of a PUSCH transmission/reception procedure. Referring to FIG. 6, the UE may detect the PDCCH in slot #n. Here, the PDCCH includes uplink scheduling information (e.g., DCI formats 0_0, 0_1). DCI formats 0_0 and 0_1 may include the following information:

Frequency domain resource assignment (FDRA), which indicates the RB set allocated to the PUSCH Time domain resource assignment (TDRA), which indicates the slot offset K2, the start position (e.g., symbol index) and length (e.g., number of OFDM symbols) of the PUSCH in the slot. The start symbol and length may be indicated through a Start and Length Indicator Value (SLIV), or may be indicated respectively.

The UE may transmit the PUSCH in slot #(n+K2) according to the scheduling information received in slot #n. The PUSCH may include a UL-SCH TB.

Figure 7:
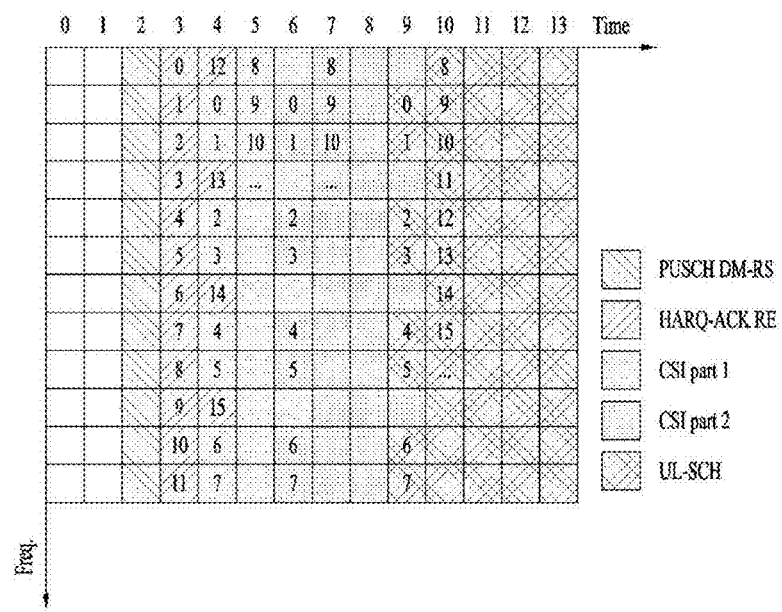
FIG. 7 illustrates an example of multiplexing uplink control information (UCI) with a PUSCH.

FIG. 7 illustrates exemplary multiplexing of UCI in a PUSCH. If a plurality of PUCCH resources overlap with a PUSCH resource in a slot and a PUCCH-PUSCH simultaneous transmission is not configured in the slot, UCI may be transmitted on a PUSCH (UCI piggyback or PUSCH piggyback), as illustrated. In the illustrated case of FIG. 8, an HARQ-ACK and CSI are carried in a PUSCH resource.

Multimedia Broadcast/Multicast Service (MBMS)

Hereinafter, MBMS schemes used in 3GPP LTE will be described. 3GPP MBMS may be classified as (i) a single frequency network (SFN) scheme in which a plurality of BS cells are synchronized to transmit the same date on a PMCH, and (ii) a single cell point to multipoint (SC-PTM) scheme in which broadcasting is performed over a PDCCH/PDSCH in the coverage of a corresponding cell. The SFN scheme is used to provide broadcast services over a wide area (e.g., MBMS area) on semi-statically pre-allocated resource(s), whereas the SC-PTM scheme is used to provide broadcast services within a cell coverage on dynamic resource(s).

SC-PTM provides one logical channel, i.e., a single cell multicast control channel (SC-MCCH) and one or more logical channels, i.e., one or more single cell multicast traffic channels (SC-MTCHs). The logical channels are mapped to a transport channel, a DL-SCH, and a physical channel, a PDSCH. The PDSCH carrying SC-MCCH data or SC-MTCH data is scheduled by a PDCCH scrambled with a group RNTI (G-RNTI). In this case, a temporary mobile group identity (TMGI) corresponding to a service ID may be one-to-one mapped to a specific G-RNTI value. Thus, if the BS provides a plurality of services, a plurality of G-RNTI values may be allocated for SC-PTM transmission. One or more UEs may perform PDCCH monitoring based on a specific G-RNTI to receive a specific service. For the specific service/G-RNTI, an SC-PTM dedicated DRX on-duration may be configured. In this case, the UEs may wake up for specific on-duration(s) and perform the PDCCH monitoring based on the G-RNTI.

Prioritization of PUCCH for Multicast/Broadcast Service (MBS)

The above descriptions (3GPP system, frame structure, NR system, etc.) may be applied in combination with the methods proposed in the present disclosure, which will be described later, or used as supplements to clarify the technical features of the methods proposed in the present disclosure. In this document, '/' may mean 'and', 'or', or 'and/or' depending on the context.

REL-17 NR intends to introduce a DL broadcast or DL multicast transmission method to support multicast/broadcast service (MBS) services. In a point-to-multipoint (PTM) transmission method such as MBS, one DL broadcast/multicast transmission is received by multiple UEs, and thus the PTM transmission method has an advantage of saving radio resources, compared to when a DL unicast transmission is transmitted to each UE (e.g., point-to-point transmission).

In NR, a method in which a UE reports MBS related feedback (e.g., HARQ feedback for retransmission) to a BS for reliable DL broadcast/multicast transmission is considered. In this case, there may be a problem that the UE is incapable of simultaneously performing unicast transmission/reception and MBS PUCCH transmission due to UE capability limitations, etc.

Accordingly, the present disclosure proposes a method of prioritizing MBS PUCCH transmission overlapping with unicast transmissions according to priorities.

MBS Transmitter (BS)

To broadcast MBS services on a cell, the BS managing the corresponding cell may transmit SIB1, an MBS SIB, at least one MCCH, and/or at least one MTCH. The MCCH and MTCH, each corresponding to a logical channel, may be transmitted on a PDSCH, which is a physical channel, and scheduled by a PDCCH. The MCCH may carry MBS control information, and the MTCH may carry MBS data.

The BS may provide UEs with a BWP for the MBS (e.g., a common frequency resource (CFR) for the MBS or an MBS BWP). The MBS BWP may include at least one of an MBS SIB-DL/UL BWP for the MBS SIB, an MCCH-DL/UL BWP for the MCCH, and/or an MTCH-DL/UL BWP for the MTCH. One cell may provide zero or one or more MBS DL BWPs and/or zero or one or more MBS UL BWPs. Therefore, if the BS supports the MBS, the BS may provide all MBS BWP types, independently of conventional initial BWPs or UE-dedicated BWPs. Alternatively, the BS may provide zero or some MBS BWPs. Some or all of the MBS BWPs may be the same as or different from the conventional initial BWP, default BWP, first active BWP, or active BWP.

The UE may configure transmission of a single cell RNTI (SC-RNTI) and transmission of an MCCH based on the MBS SIB or MBS control information provided by the BS. In this case, the MBS SIB or MBS control information may include information on the configuration of a DL BWP/UL BWP for the MBS.

The MBS SIB or MBS control information may include at least part of the following information.

PUCCH resource sets for MBS related feedback: A common PUCCH resource, which is associated with a specific service ID (e.g., TMGI), a specific G-RNTI, a specific MBS DL BWP, specific MTCH(s), or specific MCCH(s), may be configured. Alternatively, a UE-dedicated PUCCH resource may be configured for each UE that receives a specific service or a specific G-RNTI transmission.

RACH resources for MBS related feedback: RACH resource information associated with a specific service ID (e.g., TMGI), a specific G-RNTI, a specific MBS DL BWP, specific MTCH(s), or specific MCCH(s) may be provided. For example, a specific RACH preamble, a specific preamble occasion, or a specific RACH occasion may be associated with a specific service ID (e.g., TMGI), a specific G-RNTI, a specific MBS DL BWP, specific MTCH(s), or specific MCCH(s).

The BS may provide the MBS in a UL BWP/DL BWP. For example, MCCH control information and/or MTCH data may be provided in the DL BWP. MBS related feedback on a PDSCH for an MCCH or MBS related feedback on a PDSCH for an MTCH may be provided in the UL BWP. The UL BWP may be used to report a HARQ ACK/NACK or MBS related SSB/CSI-RS measurement results of the MBS related feedback.

The BS may configure UE-common PUCCH resource set(s) for a specific UL BWP of a specific cell for MBS related feedback. The UE-common PUCCH resource set may be used by UEs that transmit HARQ feedback for a specific MBS PDSCH. The BS may configure at least one UE-common PUCCH resource set as shown in Table 6 below.

TABLE 6

```
- PUCCH-ResourceSet ::= SEQUENCE {
pucch-ResourceSetId                    PUCCH-ResourceSetId,
resourceList SEQUENCE (SIZE (1..maxNrofPUCCH-ResourcesPerSet)) OF PUCCH-
ResourceId,
maxPayloadSize INTEGER (4..256) OPTIONAL -- Need R}
-PUCCH-Resource ::= SEQUENCE {
pucch-ResourceId                       PUCCH-ResourceId,
startingPRB PRB-Id,
intraSlotFrequencyHopping ENUMERATED { enabled } OPTIONAL, -- Need R
secondHopPRB PRB-Id OPTIONAL, -- Need R
format CHOICE {
format0 PUCCH-format0,
format1 PUCCH-format1,
format2 PUCCH-format2,
format3 PUCCH-format3,
format4 PUCCH-format4 }}
```

Figure 8:
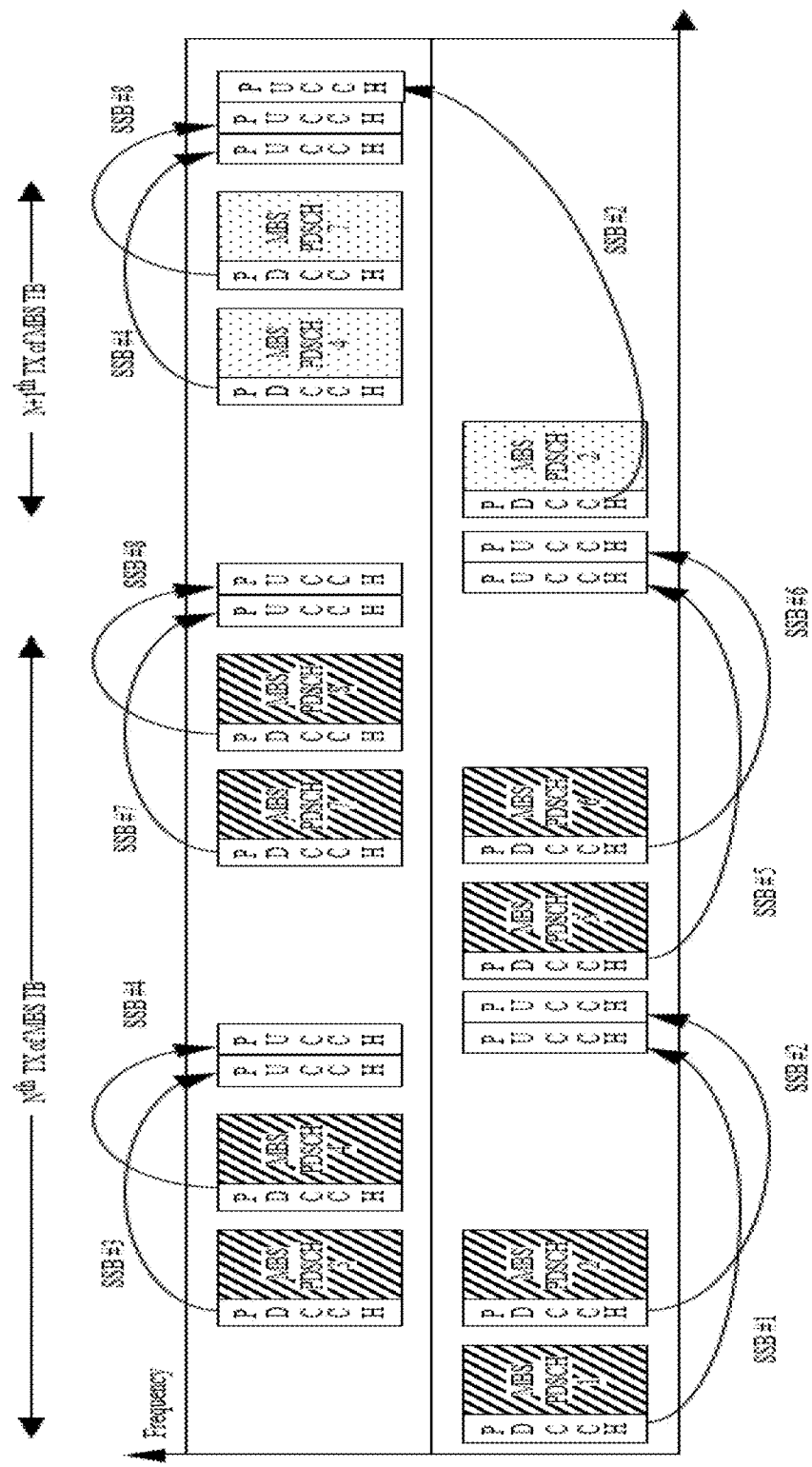
FIG. 8 illustrates a broadcast or multicast according to an embodiment of the present disclosure.

At least one piece of MTCH data and/or at least one piece of MCCH data may be included in one MBS transport block (TB) and transmitted in DL. The BS may transmit (at least) one MBS TB over an MBS PDSCH. In FIG. 8, one MBS PDSCH may be scheduled by DCI in a PDCCH. In this case, the CRC of the DCI may be scrambled with a G-RNTI. A plurality of UEs may receive the DCI, decode a PDSCH scheduled by the DCI, and receive the (at least one) MBS TB.

If a plurality of UEs need to perform reception on different beams, the BS may transmit different MBS PDSCHs based on different beam RSs of one cell. In this case, the different MBS PDSCHs may repeatedly carry the same MBS TB(s).

FIG. 8 illustrates a method of allocating and transmitting UE-common PUCCH resources associated with MBS PDSCH retransmission and SSB indices according to an embodiment of the present disclosure.

For example, in FIG. 8, all MBS PDSCHs may repeatedly carry the same MBS TB, and different MBS PDSCHs represented by the same shade may be related to different RSs/TCI states. That is, one or more SSB indices of the cell may be associated with one MBS PDSCH. For example, SSB index 1 may be associated with MBS PDCCH/PDSCH 1, SSB index 2 may be associated with MBS PDCCH/PDSCH 2, and SSB index 3 may be associated with MBS PDCCH/PDSCH 3. Alternatively, at least one CSI-RS resource of the cell may be associated with one MBS PDSCH.

For MBS PDCCH monitoring, the BS may provide at least one CORESET and/or at least one search space set (SSS) in at least one DL BWP. In this case, at least one TCI state, at least one SSB index, and/or at least one CSI-RS resource may be associated with at least one CORESET/SSS.

MBS Receiver (UE)

If the UE is in the RRC connected state (hereinafter referred to as an RRC connected UE), the UE may select a CORESET/SSS depending on the current TCI state of the UE and then receive DCI by monitoring a PDCCH in the selected CORESET/SSS. If the UE is in the RRC idle/inactive state (hereinafter referred to as an RRC idle/inactive UE), the UE may periodically measure SSB indices/CSI-RS resources and select a CORESET/SSS associated with an SSB index/CSI-RS resource of which the measurement result is more than or equal to a threshold. Thereafter, the UE may receive DCI by monitoring a PDCCH in the selected CORESET/SSS.

The UE may monitor an MBS PDCCH in a DL BWP for the MBS. If a CORESET/SSS associated with the current TCI state and/or a CORESET/SSS associated with an SSB index and/or CSI-RS resource of which the measurement result is above the threshold exists in a plurality of DL BWPs, the idle/inactive UE may preferentially select an initial BWP or a DL BWP overlapping with the initial BWP, and the connected UE may preferentially select a current active BWP or configured BWP or a DL BWP overlapping with the current active BWP or configured BWP.

The UE may monitor the MBS PDCCH in the selected DL BWP. If there are a plurality of CORESETs/SSSs associated with to the current TCI state or a plurality of CORESETs/SSSs associated with an SSB index and/or CSI-RS resource of which the measurement result is above the threshold, the UE may select a CORESET/SSS that does not overlap with other transmission/reception operations or select a CORESET/SSS closest to the corresponding SSB index/C SI-RS resource.

The UE may monitor the PDCCH in the selected CORESET/SSS and receive DCI over the PDCCH. The UE may decode the DCI of which the CRC is scrambled with the G-RNTI of an MBS service that the UE desires to receive.

The DCI for the G-RNTI received by the UE may include at least part of the following information.
  Identifier for DCI formats
  Frequency domain resource assignment
  SS/PBCH index or CSI-RS resource indicator or TCI state ID
  Time domain resource assignment
  VRB-to-PRB mapping
  Modulation and coding scheme
  New data indicator
  Redundancy version
  HARQ process number The UE may receive a PDSCH scheduled by the DCI. In this case, the 'SS/PBCH index or CSI-RS resource indicator or TCI state ID' may indicate at least one of an SS/PBCH index associated with the scheduled PDSCH, a CSI-RS resource indicator, and/or a TCI state ID. The UE may receive the PDSCH based on the indicated SS/PBCH index/CSI-RS resource indicator/TCI state ID. In addition, the DCI may include at least part of the following information for allocating PUCCH resources for HARQ feedback.
  HARQ feedback enabling indicator—1 bit
  TPC command for scheduled PUCCH—2 bits
  PUCCH resource indicator—3 bits
  PDSCH-to-HARQ feedback timing indicator—3 bits If HARQ feedback enabling indicator=0, the UE may decode the DCI by assuming that the DCI does not include the TPC command for scheduled PUCCH field, the PUCCH resource indicator field, and/or the PDSCH-to-HARQ feedback timing indicator field. In addition, the UE may not transmit HARQ feedback for the PDSCH scheduled by the corresponding DCI.

If HARQ feedback enabling indicator=1, the UE may decode the DCI by assuming that the DCI includes the TPC command for scheduled PUCCH field, the PUCCH resource indicator field, and/or the PDSCH-to-HARQ feedback timing indicator field. The UE may transmit HARQ feedback for the PDSCH scheduled by the corresponding DCI on a PUCCH resource indicated by the included information. In this case, the UE may perform PUCCH transmission on the PUCCH resource based on information on the SS/PBCH index/CSI-RS resource indicator/TCI state ID indicated by the corresponding DCI. UCI carried by the PUCCH may include HARQ feedback information. The HARQ feedback information may be determined as an ACK or NACK depending to the decoding result of the PDSCH scheduled by the corresponding DCI.

The BS may transmit beams related to different SS/PBCH indices, different CSI-RS resource indicators, or different TCI states for different PDSCHs carrying the same MBS TB(s). Here, different PDSCHs carrying the same MBS TB(s) may be referred to as an MBS PDSCH set. For example, in FIG. 8, different PDSCHs in one MBS PDSCH set such as PDSCH 1, PDSCH 2, and PDSCH 3 may be associated with different SS/PBCHs, different CSI-RS resources, and/or different TCI states.

If no SSB indices, no CSI-RS resources, and/or no TCI states are indicated by DCI, the BS may configure the SSB index, CSI-RS resource, and/or TCI state associated with each PUCCH resource in an RRC message. That is, at least one SSB index, at least one CSI-RS resource, and/or at least one TCI state may be configured for one PUCCH resource by the RRC message. In this case, if the UE performs PUCCH transmission on a PUCCH resource indicated by DCI, the UE may perform the PUCCH transmission for HARQ feedback based on the SSB index, CSI-RS resource, and/or TCI state associated with the PUCCH resource.

For example, one or more MBS related PUCCH resource set(s) may be configured for each MBS related UL frequency resource (e.g., each UL common frequency resource or each MBS UL BWP). One MBS related UL common frequency resource/UL BWP may be associated with at least one MBS related DL common frequency resource/DL BWP. A plurality of MBS related UL common frequency resources/UL BWPs may be associated with at least one MBS related DL common frequency resource/DL BWP.

MBS Related PDSCH Set and MBS Related PUCCH Resource Set

The UE may receive at least one PDSCH from among a plurality of PDSCHs (e.g., one MBS PDSCH set) for the same MBS TB(s). For example, if both the measurement results for SSB indices 1 and 2 are more than or equal to a threshold, the UE may receive both MBS PDSCH 1 and MBS PDSCH 2. Alternatively, the UE may receive either PDSCH 1 or PDSCH 2. If a PDCCH for PDSCH 1 and/or a PDCCH for PDSCH 2 indicates that HARQ feedback enabling indicator=1 or if HARQ feedback is enabled for services of a corresponding TB through signaling such as RRC/MAC CE, the UE may select one of the received PDSCH(s) and transmit the HARQ feedback on a PUCCH resource associated with the selected PDSCH.

For example, one MBS PDSCH set may be associated with one MBS related PUCCH resource set. One MBS related PUCCH resource set may include N MBS related PUCCH resources. If one MBS PDSCH set includes M PDSCHs carrying the same TB, the M PDSCHs may be associated with N PUCCH resources. In this case, one of the M PDSCHs may be associated with at least one of the N PUCCH resources. Alternatively, at least one PDSCH for the same TB(s) may be associated with one PUCCH resource. A plurality of PDSCHs for the same TB(s) may be associated with a plurality of MBS related PUCCH resources. The N MBS related PUCCH resources may be associated with at least one RS (e.g., SSB or CSI-RS) and/or at least one TCI state. One PUCCH resource may be associated with at least one RS/TCI state. Alternatively, a plurality of PUCCH resources may be associated with at least one RS/TCI state.

FIG. 9 illustrates a MAC control element (MAC CE) for activation/deactivation of MBS related PUCCH spatial relation according to an embodiment of the present disclosure.

For example, the activation/deactivation of the PUCCH spatial relation may be indicated by the MAC CE as shown in FIG. 9. The serving cell ID field may indicate a cell in which an MBS PUCCH resource is configured. The BWP ID field may indicate a UL BWP or UL common frequency resource in which the MBS PUCCH resource is configured. The PUCCH resource ID field may indicate a PUCCH resource where the relation is to be activated/deactivated. Different S fields, each occupying one bit, may indicate activation/deactivation of relation between different RSs/TCI states. This MAC CE may be transmitted to the UE over a PDSCH scheduled by DCI having a CRC scrambled with a specific RNTI (e.g., C-RNTI/G-RNTI/SC-RNTI). In the case of the G-RNTI or SC-RNTI, multiple UEs may receive the MAC CE and activate/deactivate spatial relation for a UE-common PUCCH resource. In the case of the C-RNTI, a specific UE may receive the MAC CE and activate/deactivate spatial relation for a UE-common/UE-dedicated PUCCH resource. Meanwhile, the above information may be included in DCI or an RRC message over the PDSCH scheduled by the DCI rather than the MAC CE.

PDSCH-to-PUCCH resource relation may be configured/activated/deactivated through network signaling (e.g., DCF-MAC CE/RRC message). The PDSCH-to-PUCCH resource relation may be configured/activated/deactivated for each BWP, for each cell, for each UE, or for each MBS service. For example, the network signaling (e.g., DCI/MAC CE/RRC message) for activation/deactivation of the PDSCH-to-PUCCH relation may include at least one of the following fields: a field indicating a cell in which the MBS PDSCH is configured; a field indicating a DL BWP/DL common frequency resource in which the MBS PDSCH is configured; a filed indicating a PUCCH resource ID associated with a PDSCH; a field indicating a cell in which the MBS PUCCH resource is configured; and/or a field indicating a UL BWP/UL common frequency resource in which the MBS PUCCH resource is configured. The activation/deactivation of the PDSCH-to-PUCCH relation may be indicated/performed based thereon.

PUCCH Resource Configuration Based on (i) MBS Related NACK Only or (ii) MBS Related ACK/NACK (i) NACK only based HARQ feedback or (ii) ACK/NACK based HARQ feedback may be configured/transmitted (on a PUCCH resource) by network signaling (e.g., DCI/MAC CE/RRC message).

(i) In the case of the NACK only based HARQ feedback, HARQ feedback is transmitted only when the result of TB reception over an associated PDSCH is a NACK. That is, no HARQ feedback is transmitted when the result is an ACK. In other words, when the result is an ACK, the UE transmits no PUCCH for the ACK. For PUCCH format 0, when the result is a NACK, the HARQ-ACK information bit may be set to 1 or 0.

(ii) In the case of the ACK/NACK based HARQ feedback, if the result of TB reception over an associated PDSCH is a NACK, HARQ feedback including the NACK is transmitted. If the result is an ACK, HARQ feedback including the ACK is reported.

An MBS related PUCCH resource set may be shared between multiple UEs receiving the same TB(s). For all PUCCH resources in the PUCCH resource set, (i) the NACK only based HARQ feedback or the ACK/NACK based HARQ feedback may be commonly configured. Alternatively, (i) the NACK only based HARQ feedback or (ii) the ACK/NACK based HARQ feedback may be configured for each PUCCH resource.

All or some of the PUCCH resources in the PUCCH resource set may be configured for (ii) the ACK/NACK based HARQ feedback, and the PUCCH resources for ACKs/NACKs may be allocated to at least one UE receiving the MBS. At least one of the allocated PUCCH resources may be a UE-dedicated MBS PUCCH resource (for one UE). If the UE-dedicated MBS PUCCH resource is configured, the UE may transmit HARQ A/N for at least one MBS TB on the corresponding UE-dedicated MBS PUCCH resource. For example, if IDs of a plurality of PUCCH resources are configured in the PUCCH resource set, each UE may be allocated one PUCCH resource ID and set the corresponding PUCCH resource as the UE-dedicated MBS PUCCH resource. When every UE receiving a specific MBS TB is in RRC connected mode, the BS may allocate such an MBS related PUCCH resource ID to the UE through network signaling (e.g., UE-dedicated RRC message, UE-dedicated MAC CE, UE-dedicated DCI, etc.). Alternatively, the UE-dedicated MBS related PUCCH resource ID may be allocated according to a specific calculation formula. In this case, the specific calculation formula may include the UE ID or C-RNTI of the corresponding UE as an input factor, and the PUCCH resource ID may be calculated based thereon. For example, if there are N PUCCCH resource IDs in the PUCCH resource set, it may be satisfied that 'UE-dedicated PUCCH resource ID=UE ID mod N' or 'UE-dedicated PUCCH resource ID=C-RNTI mod N'.

When all or some of the PUCCH resources in the PUCCH resource set are configured for (i) the NACK only based HARQ feedback, the PUCCH resources for NACKs only may be allocated for at least one service (e.g., TMGI), which may be shared between multiple UEs receiving the same TB(s). Accordingly, all UEs receiving at least one same TB may be allocated (the same) NACK only PUCCH resource(s), and the UEs may transmit NACK (if necessary under the determination of each UE).

MBS Related PUCCH Priority

When DCI having a CRC scrambled with a G-RNTI or C-RNTI schedules an MBS PDSCH, the corresponding DCI may allocate a PUCCH resource and/or indicate PUCCH priority. For example, the PUCCH priority may indicate whether the priority of the allocated PUCCH resource is HP or LP, where HP denotes high priority and LP denotes low priority. Alternatively, when HARQ feedback for a TB needs to be transmitted on a PUCCH, the DCI may indicate a logical channel with the highest priority (i.e., the highest priority with the smallest priority value) among logical channels included in the TB.

When the UE in RRC connected mode transmits HARQ feedback for TB(s), which are received on an MBS PDSCH, over a PUCCH, the MBS HARQ feedback may overlap/collide with other UL transmissions. For example, a unicast PUCCH/PUSCH may overlap with a PUCCH (or UCI) for MBS HARQ feedback.

Example 1) When the PUCCH (or UCI) for MBS HARQ feedback collides/overlaps with the unicast PUSCH (for example, when multiplexing is required because the PUCCH (or UCI) for MBS HARQ feedback and the unicast PUSCH are scheduled on the same time resource, that is, when simultaneous transmission thereof is not allowed without multiplexing), the UE may perform at least one of the following operations:

When DCI scheduling the unicast PDSCH indicates HP for the unicast, the UE may drop the MBS PUCCH.

When MBS DCI indicates HP for the MBS, the UE may drop the unicast PUSCH.

For a combination of {unicast HP+MBS HP/LP} or {unicast LP+MBS LP}, the UE may drop the MBS PUCCH.

For a combination of (unicast LP+MBS HP), the UE may drop the unicast PUSCH.

The UE may secure resources for transmitting the MBS PUCCH A/N by partially puncturing resources for transmitting the unicast PUSCH.

The UE may change/switch/convert NACK only based HARQ feedback to ACK/NACK based HARQ feedback (for example, the NACK only configuration is overridden at least temporarily at the corresponding timing even if there is no switching instruction to the A/N scheme from the BS). Then, the UE may multiplex the MBS PUCCH (UCI) for the changed ACK/NACK based HARQ feedback with the unicast PUSCH (e.g., PUSCH carrying A/N for unicast transmission).

The UE may transmit MBS HARQ feedback on an MBS PUCCH occasion associated with the same RS as the MBS PUCCH or on an MBS PUCCH occasion associated with a different RS from the MBS PUCCH.

Example 2) When the PUCCH (or UCI) for MBS HARQ feedback collides/overlaps with the unicast PUCCH (for example, when multiplexing is required because the PUCCH (or UCI) for MBS HARQ feedback and the unicast PUCCH are scheduled on the same time resource, that is, when simultaneous transmission thereof is not allowed without multiplexing), the UE may perform at least one of the following operations:

When DCI scheduling the unicast PUCCH indicates unicast HP, the UE may drop the MBS PUCCH.

When MBS DCI indicates MBS HP, the UE may drop the unicast PUCCH.

For a combination of {unicast HP+MBS HP/LP} or {unicast LP+MBS LP}, the UE may drop the MBS PUCCH.

For a combination of {unicast LP+MBS HP}, the UE may drop the unicast PUCCH.

The UE may change/switch/convert NACK only based HARQ feedback to ACK/NACK based HARQ feedback (for example, the NACK only configuration is overridden at least temporarily at the corresponding timing even if there is no switching instruction to the A/N scheme from the BS). Then, the UE may multiplex the MBS PUCCH (UCI) for the changed ACK/NACK based HARQ feedback with the unicast PUCCH (e.g., PUCCH carrying ACK/NACK for unicast transmission).

The UE may transmit MBS HARQ feedback (A/N) on an MBS PUCCH occasion associated with the same RS as the MBS PUCCH or on an MBS PUCCH occasion associated with a different RS from the MBS PUCCH.

The UE may preferentially transmit the MBS PUCCH if the MBS PUCCH is the ACK/NACK based HARQ feedback. On the other hand, the UE may drop the MBS PUCCH if the MBS PUCCH is the NACK only based HARQ feedback.

Example 3) When the PUCCH (or UCI 1) for MBS HARQ feedback collides/overlaps with the MBS PUCCH (or UCI 2) (for example, when multiplexing is required because t the PUCCH (or UCI 1) for MBS HARQ feedback and the MBS PUCCH (or UCI 2) are scheduled on the same time resource, that is, when simultaneous transmission thereof is not allowed without multiplexing), the UE may perform at least one of the following operations:

The UE may transmit a HP PUCCH (or UCI) for MBS HP indicated by MBS DCI in preference to a LP PUCCH (or UCI) for MBS LP. That is, the UE may drop the PUCCH for MBS LP indicated by the MBS DCI due to the PUCCH for MBS HP.

If the MBS PUCCH is ACK/NACK based HARQ feedback, the UE transmits the MBS PUCCH preferentially, and if the MBS PUCCH is NACK only based HARQ feedback, the UE may drop the MBS PUCCH (alternatively, if the MBS PUCCH is ACK/NACK based HARQ feedback, the UE may drop the MBS PUCCH, and if the MBS PUCCH is NACK only based HARQ feedback, the UE may preferentially transmit the MBS PUCCH).

The UE may change/switch/convert the NACK only based HARQ feedback to the ACK/NACK based HARQ feedback (for example, the NACK only configuration is overridden at least temporarily at the corresponding timing even if there is no switching instruction to the A/N scheme from the BS). Then, the UE may perform multiplexing on the MBS PUCCHs (UCIs). For example, UCI 1 and UCI 2 may be multiplexed based on the ACK/NACK based HARQ feedback scheme.

The UE may transmit MBS HARQ feedback on an MBS PUCCH occasion associated with the same RS as the MBS PUCCH or on an MBS PUCCH occasion associated with a different RS from the MBS PUCCH.

The UE may preferentially transmit the ACK/NACK based HARQ feedback and drop the NACK only based HARQ feedback.

As described above, when the UE intends to receive an MBS PDSCH associated with a specific RS and transmit HARQ feedback for the MBS PDSCH on a UL resource associated with the specific RS, the UE may transmit the MBS HARQ feedback on an MBS PUCCH occasion associated with another RS due to the collision problem. In this case, the UE may perform transmission by changing (increasing) the TX power of a PUCCH transmitted based on the other RS by a predetermined offset from the original PUCCH TX power. The predetermined offset may be calculated based on a difference between the measurement quality of the specific RS and the measurement quality of the other RS, a value configured by the BS to the UE, or a lower or higher value thereof. The UE may be defined to transmit the HARQ feedback only when the measurement quality of the other RS is greater than or equal to a threshold. In addition, if the PUCCH TX power increased by the offset exceeds the UE maximum transmission power, the PUCCH transmission based on the other RS may be performed with the UE maximum transmission power.

On the other hand, when the UE intends to receive the MBS PDSCH associated with the specific RS and transmit the HARQ feedback therefor on the UL resource associated with the specific RS, the UE may transmit the MBS HARQ feedback on the MBS PUCCH occasion associated with the other RS due to the collision problem as described above. In this case, the UE may repeatedly transmit the MBS HARQ feedback on a plurality of PUCCH resources. When the UE repeatedly transmits the HARQ feedback on the plurality of PUCCH resources, the UE may perform transmission with the original PUCCH TX power or with a value lowered by a predetermined offset.

For example, priorities may be defined as follows. If UL transmissions collide with each other, the UE drops low-priority information first and transmits high-priority information preferentially (if dropping is required). Here, the latest information has the lowest priority (i.e., in the case of X>Y, X is prioritized over Y).

Priority Rule 1: NR Rel. 15/16 HARQ A/N>Unicast MBS HARQ A/N>Multicast MBS HARQ A/N>NACK only>SR>unicast CSI>multicast CSI Priority Rule 2: NR Rel. 15/16 HARQ A/N>Unicast MBS HARQ A/N>SR>Multicast MBS HARQ A/N>NACK only>unicast CSI>multicast CSI Priority Rule 3: NR Rel. 15/16 HARQ A/N>Unicast MBS HARQ A/N>Multicast MBS HARQ A/N>SR>NACK only>unicast CSI>multicast CSI Priority Rule 4: The priorities may be configured (determined) based on the RRC configuration of the BS (UE). For example, the UE may be configured with one of the above methods through network signaling of the BS.

Priority Rule 5: When DCI transmitted by the BS schedules an MBS PUCCH or MBS PUSCH, the corresponding DCI may include information on whether the priority of the MBS PUCCH/PUSCH is higher or lower than that of unicast. For example, the UE may follow one of the above methods according to the priority indicated by the DCI.

As described above, the priority and multiplexing of for MBS related PUCCH transmission overlapping with unicast transmission may be defined according to the priorities, and thus, it is possible to avoid ambiguity in the MBS related PUCCH transmission or misalignment between the UE and BS when simultaneous transmission is not allowed.

In the above examples, an MBS BWP may be referred to as a "common frequency resource (CFR)", and the CFR may be configured only for DL as described above. In this case, a HARQ-ACK (or NACK only) may be transmitted in a (unicast) active UL BWP. HARQ feedback may correspond to an A/N report or a NACK only report depending on higher layer configurations. For example, when the NACK only scheme is configured, the UE may transmit HARQ feedback if the UE fails to receive a related MBS. On the contrary, the UE may drop ACK transmission if the UE correctly receives the MBS. When the A/N reporting scheme is configured, the UE may report a HARQ-ACK response in both cases of an ACK and a NACK.

Figure 10:
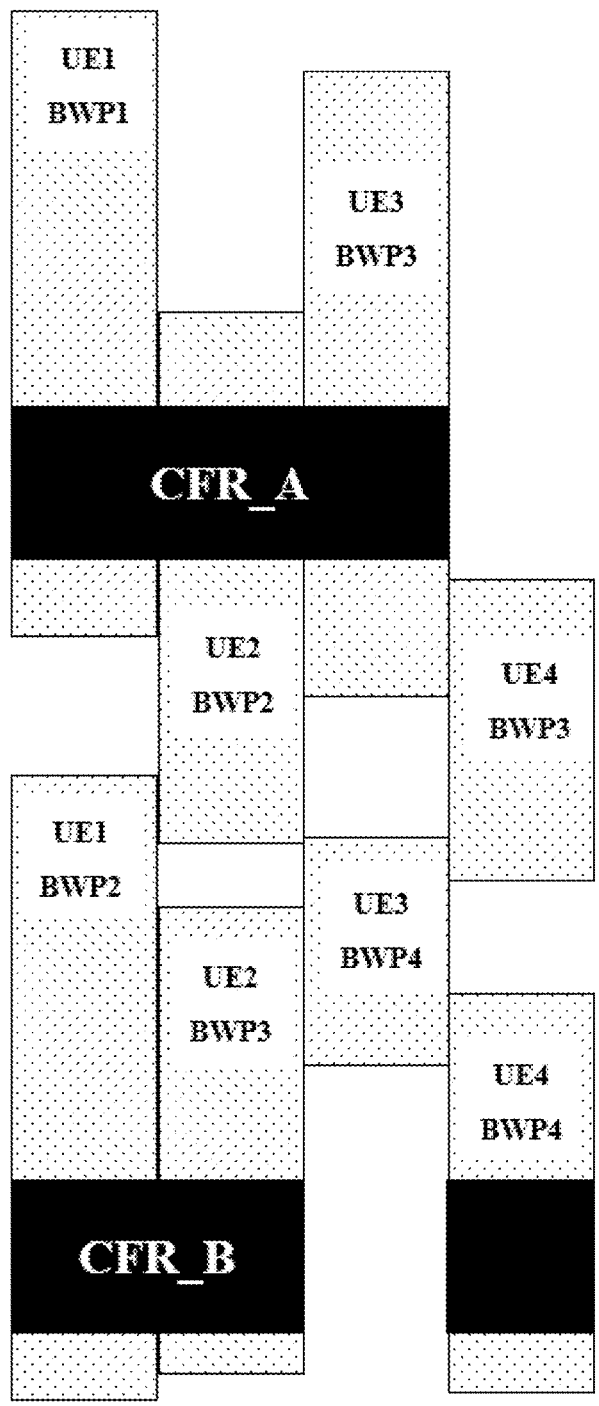
FIG. 10 illustrates exemplary relation between common frequency resources (CFRs) and bandwidth parts (BWPs)

A CFR for the MBS may provide the same MBS to one or more UEs. FIG. 10 illustrates exemplary relation between CFRs and BWPs. In FIG. 10, CFR_A may be associated with BWP 1 of UE 1 (for example, CFR_A may be configured in BWP 1), and CFR_B may be associated with BWP 2 of UE 1 (for example, CFR_B may be configured in BWP 2). In addition, CFR_A may be configured for BWP 2 of UE 2 and BWP 3 of UE 3, and CFR_B may be configured for BWP 3 of UE 2 and BWP 4 of UE 4. Accordingly, CFR_A may be a CFR for UEs 1, 2, and 3, and CFR_B may be a CFR for UEs 1, 2, and 4.

For example, it is assumed that the current active BWP of UE 1 is BWP 1 and UE 1 is receiving an MBS on CFR_A associated with BWP 1 of UE 1. In this case, if UE 1 is instructed by DCI to switch to BWP 2, UE 1 may activate BWP 2 (which is inactive) and start MBS reception on CFR_B associated with the new active BWP. When BWP switching is completed, UE 1 may deactivate BWP 1 and no longer receive CFR_A.

Figure 11:
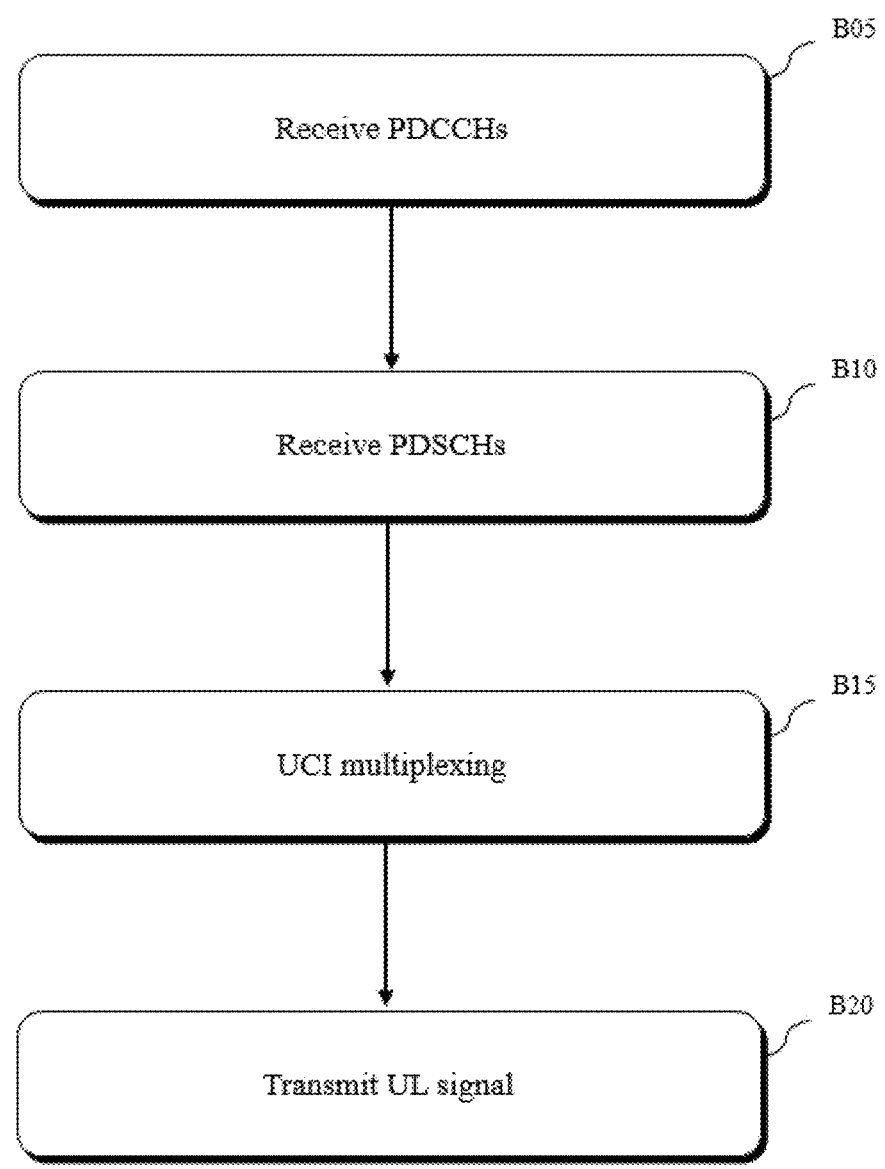
FIGS. 11 and 12 illustrate signal transmission and reception flows according to embodiments of the present disclosure.

FIG. 11 is a diagram for explaining operations of a UE according to an embodiment of the present disclosure. FIG. 11 is a particular implementation of the above-described examples, and thus the scope of the present disclosure is not limited to FIG. 11. The details described above may be referred to in FIG. 11.

Referring to FIG. 11, the UE may receive a plurality of PDCCHs, each carrying DCI (B05).

The UE may receive a plurality of PDSCHs based on the plurality of PDCCHs (B10).

The UE may transmit a single UL signal (B20) by multiplexing HARQ feedback information for each of the plurality of PDSCHs thereon (B15).

Receiving the plurality of PDCCHs may include: receiving a first PDCCH carrying first DCI for multicast scheduling; and receiving a second PDCCH carrying second DCI for unicast scheduling. Receiving the plurality of PDSCHs may include: receiving a multicast PDSCH scheduled by the first DCI; and receiving a unicast PDSCH scheduled by the second DCI. For the multicast PDSCH, the UE may be configured with either one of a first mode for reporting an ACK/NACK or a second mode for reporting NACK only.

Based on that first HARQ feedback information for the multicast PDSCH is to be multiplexed with second HARQ feedback information for the unicast PDSCH in a state in which the UE is configured with the second mode for the multicast PDSCH, the UE may generate the first HARQ feedback information based on the first mode other than the second mode configured in the UE and multiplex the first HARQ feedback information generated based on the first mode, with the second HARQ feedback information.

In the second mode, reporting of HARQ feedback information consisting of ACKs only with no NACK may be skipped.

The single UL signal may be a PUCCH.

The UE may receive configuration information indicating the second mode among the first mode and the second mode for the multicast PDSCH.

A CRC of the first PDCCH carrying the first DCI may be scrambled with a G-RNTI.

The plurality of PDSCHs may include a third PDCCH carrying third DCI for unicast scheduling.

Based on that a priority related to the first HARQ feedback information indicated by the first DCI is higher than a priority related to third HARQ feedback information indicated by the third DCI, the UE may drop the third HARQ feedback information related to the unicast scheduling and transmit the first HARQ feedback information.

Based on that the first HARQ feedback information for the multicast PDSCH is multiplexed with ACK/NACK-based fourth HARQ feedback information in a state in which the UE is configured with the second mode, the UE may generate the first HARQ feedback information based on the first mode other than the second mode configured in the UE and multiplex the first HARQ feedback information generated based on the first mode with the fourth HARQ feedback information. The fourth HARQ feedback information may be for another multicast PDSCH other than the multicast PDSCH. The first mode may be configured for the other multicast PDSCH.

Figure 12:
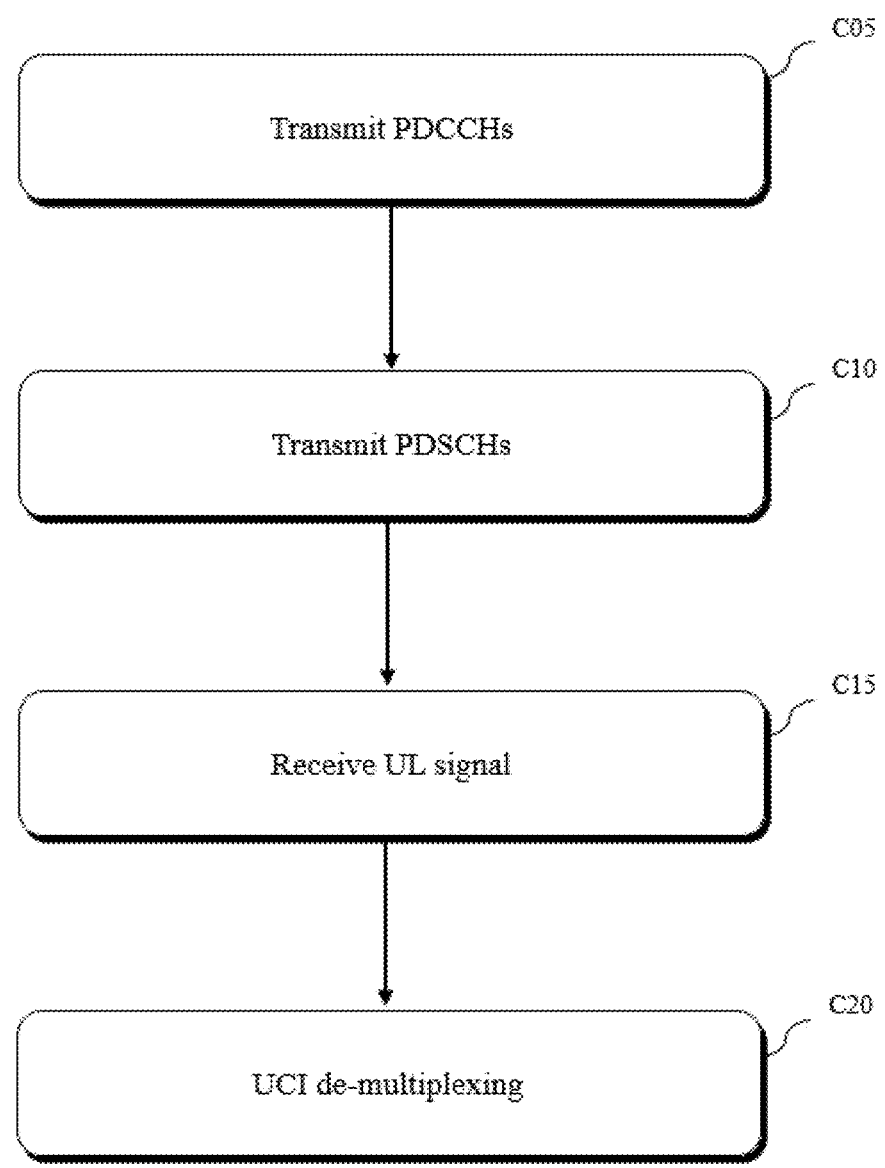

FIG. 12 is a diagram for explaining operations of a BS according to an embodiment of the present disclosure. FIG. 12 is a particular implementation of the above-described examples, and thus the scope of the present disclosure is not limited to FIG. 12. The details described above may be referred to in FIG. 12.

Referring to FIG. 12, the BS may transmit a plurality of PDCCHs, each carrying DCI (C05).

The BS may transmit a plurality of PDSCHs based on the plurality of PDCCHs (C10). The BS may receive from a UE a single UL signal on which HARQ feedback information for each of the plurality of PDSCHs is multiplexed (C15).

Transmitting the plurality of PDCCHs may include transmitting a first PDCCH carrying first DCI for multicast scheduling and transmitting a second PDCCH carrying second DCI for unicast scheduling. Transmitting the plurality of PDSCHs may include transmitting a multicast PDSCH scheduled by the first DCI and transmitting a unicast PDSCH scheduled by the second DCI. For the multicast PDSCH, the BS may configure either one of a first mode for receiving an ACK/NACK or a second mode for receiving only a NACK. Based on that first HARQ feedback information for the multicast PDSCH is to be multiplexed with second HARQ feedback information for the unicast PDSCH in a state in which the UE is configured with the second mode for the multicast PDSCH, the BS may obtain the first HARQ feedback information and the second HARQ feedback information by assuming that the first HARQ feedback information is multiplexed with the second HARQ feedback information based on the first mode other than the second mode configured in the UE (C20).

The various details, functions, procedures, proposals, methods, and/or operational flowcharts described in this document may be applied to a variety of fields that require wireless communication/connections (e.g., 5G) between devices.

Hereinafter, a description will be given in detail with reference to the drawings. In the following drawings/descriptions, the same reference numerals may denote the same or corresponding hardware blocks, software blocks, or functional blocks unless specified otherwise.

Figure 13:
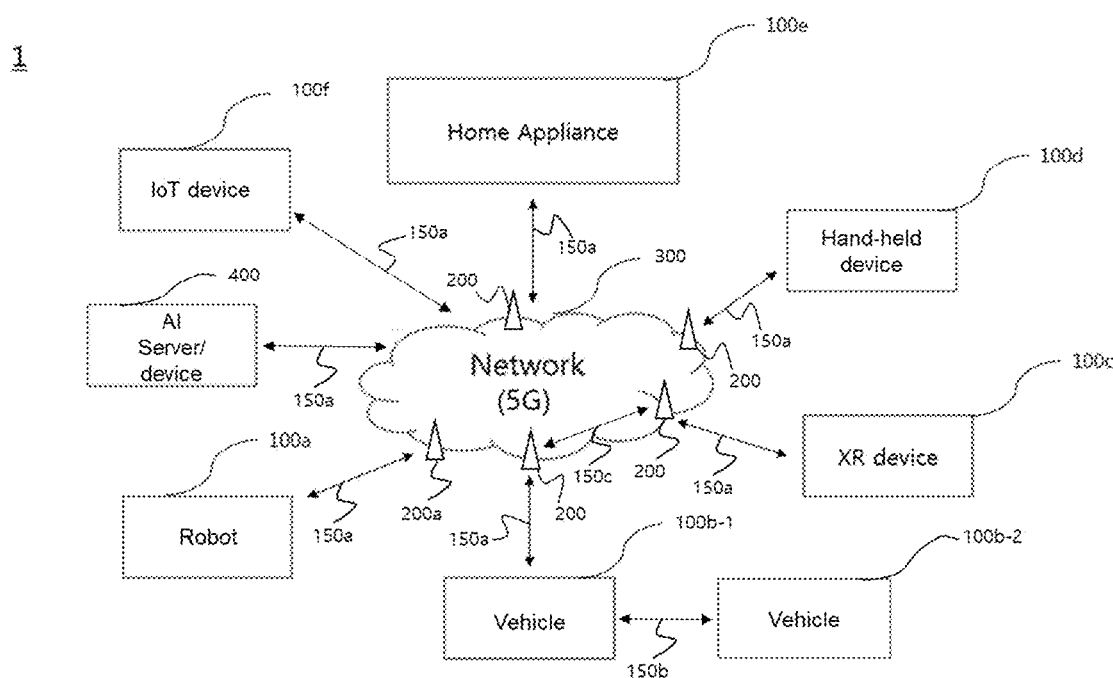
FIGS. 13 to 16 illustrate a communication system 1 and wireless devices applicable to the present disclosure.

FIG. 13 illustrates a communication system 1 applied to the present disclosure.

Referring to FIG. 13, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 14:
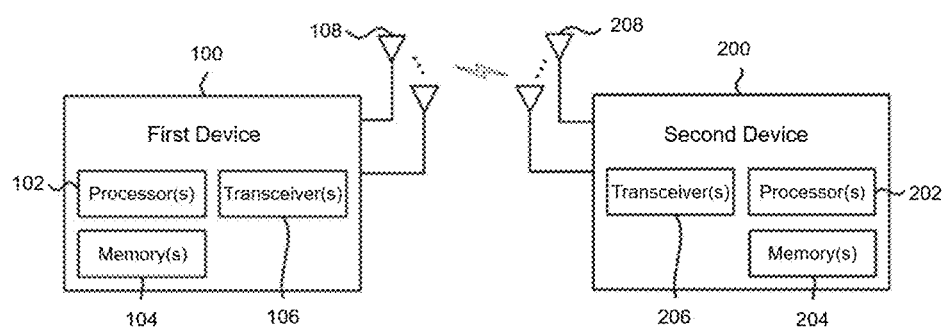

FIG. 14 illustrates wireless devices applicable to the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s)

102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/ circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 15:
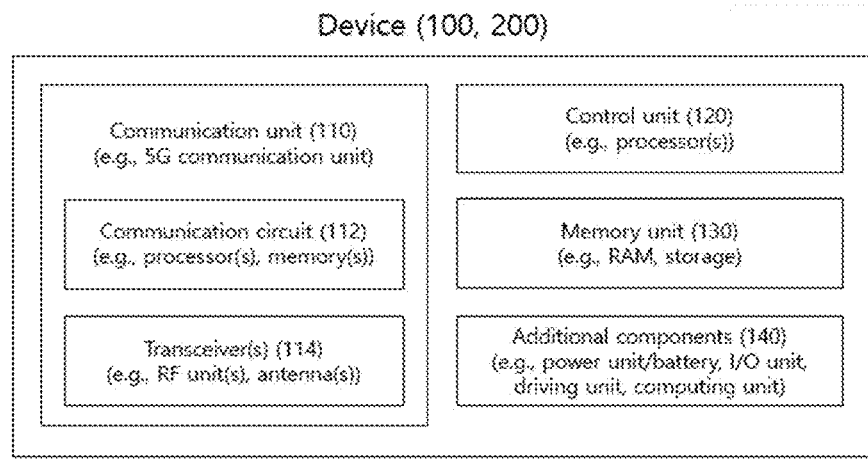

FIG. 15 illustrates another example of a wireless device applied to the present disclosure. The wireless device may be implemented in various forms according to a use-case/service (refer to FIG. 13).

Referring to FIG. 15, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 13), the vehicles (100b-1 and 100b-2 of FIG. 13), the XR device (100c of FIG. 13), the hand-held device (100d of FIG. 13), the home appliance (100e of FIG. 13), the IoT device (100f of FIG. 13), a digital broadcast terminal, a hologram device, a public safety device, an MTC device, a medicine device, a fintech device (or a finance device), a security device, a climate/environment device, the AI server/device (400 of FIG. 13), the B Ss (200 of FIG. 13), a network node, etc. The wireless device may be used in a mobile or fixed place according to a use-example/service.

In FIG. 15, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 16:
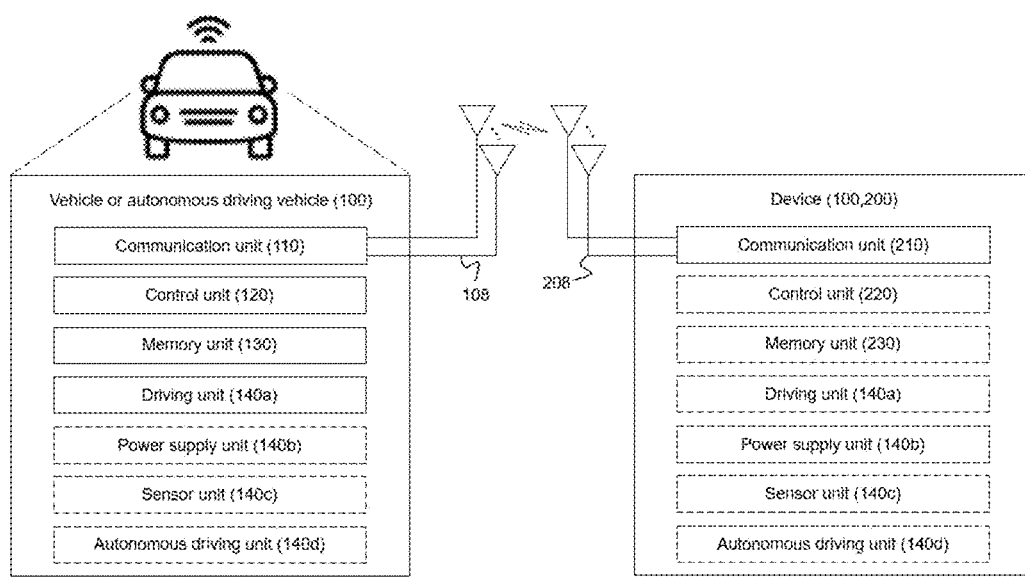

FIG. 16 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 16, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 15, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 17:
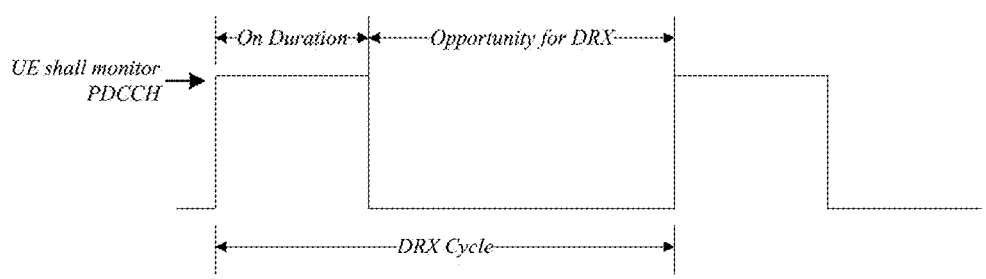
FIG. 17 illustrates discontinuous reception (DRX) operation applicable to the present disclosure.

FIG. 17 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 17, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 7 describes a DRX operation of a UE (in the RRC_CONNECTED state). Referring to Table 7, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods.

TABLE 7

|  | Type of signals | UE procedure |
|---|---|---|
| 1$^{st}$ step | RRC signalling (MAC-CellGroupConfig) | Receive DRX configuration information |
| 2$^{nd}$ Step | MAC CE ((Long) DRX command MAC CE) | Receive DRX command |
| 3$^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure is applicable to UEs, BSs, or other apparatuses in a wireless mobile communication system.

What is claimed is:

1. A method of transmitting hybrid automatic repeat request (HARQ) feedback information by a user equipment (UE) in a wireless communication system, the method comprising:
    receiving a plurality of physical downlink control channels (PDCCHs) each carrying downlink control information (DCI);
    receiving a plurality of physical downlink shared channels (PDSCHs) based on the plurality of PDCCHs; and
    transmitting a single uplink signal in which HARQ feedback information for each of the plurality of PDSCH is multiplexed,
    wherein receiving the plurality of PDCCHs comprises receiving a first PDCCH carrying first DCI for multicast scheduling and receiving a second PDCCH carrying second DCI for unicast scheduling,
    wherein receiving the plurality of PDSCHs comprises receiving a multicast PDSCH scheduled by the first DCI and receiving a unicast PDSCH scheduled by the second DCI,
    wherein, for the multicast PDSCH, the UE is configured with one of two modes including a first mode for reporting acknowledgement/negative-acknowledgement (ACK/NACK) and a second mode for reporting NACK only, and
    wherein the UE is configured with the second mode for the multicast PDSCH and, based on that first HARQ feedback information for the multicast PDSCH is to be multiplexed with second HARQ feedback information for the unicast PDSCH, the UE:
        generates the first HARQ feedback information based on the first mode other than the second mode configured in the UE; and
        multiplexes the first HARQ feedback information generated based on the first mode, with the second HARQ feedback information.

2. The method of claim 1, wherein in the second mode, reporting of HARQ feedback information consisting of ACKs without any NACK is skipped.

3. The method of claim 1, wherein the single uplink signal is a physical uplink control channel (PUCCH).

4. The method of claim 1, further comprising receiving configuration information indicating the second mode among the first mode and the second mode for the multicast PDSCH.

5. The method of claim 1, wherein a cyclic redundancy check (CRC) of the first PDCCH carrying the first DCI is scrambled with a group radio network temporary identifier (G-RNTI).

6. The method of claim 1, wherein the plurality of PDSCHs comprise a third PDCCH carrying third DCI for unicast scheduling, and
    wherein based on that a priority related to the first HARQ feedback information indicated by the first DCI is higher than a priority related to third HARQ feedback information indicated by the third DCI, the UE drops the third HARQ feedback information related to the unicast scheduling and transmit the first HARQ feedback information.

7. The method of claim 1, wherein based on that the first HARQ feedback information for the multicast PDSCH is multiplexed with ACK/NACK-based fourth HARQ feedback information in a state in which the UE is configured with the second mode, the UE:
    generates the first HARQ feedback information based on the first mode other than the second mode configured in the UE; and
    multiplexes the first HARQ feedback information generated based on the first mode with the fourth HARQ feedback information.

8. The method of claim 7, wherein the fourth HARQ feedback information is for another multicast PDSCH other than the multicast PDSCH.

9. The method of claim 8, wherein the first mode is configured for the another multicast PDSCH.

10. A computer-readable medium storing a program for executing the method of claim 1.

11. A device for wireless communication, the device comprising:
    a memory configured to store instructions; and
    a processor configured to perform operations by executing the instructions,
    wherein the operations performed by the processor comprise:
        receiving a plurality of physical downlink control channels (PDCCHs), each carrying downlink control information (DCI);
        receiving a plurality of physical downlink shared channels (PDSCHs) based on the plurality of PDCCHs; and
        transmitting a single uplink signal in which HARQ feedback information for each of the plurality of PDSCH is multiplexed,
    wherein receiving the plurality of PDCCHs comprises receiving a first PDCCH carrying first DCI for multicast scheduling and receiving a second PDCCH carrying second DCI for unicast scheduling,
    wherein receiving the plurality of PDSCHs comprises receiving a multicast PDSCH scheduled by the first DCI and receiving a unicast PDSCH scheduled by the second DCI,
    wherein for the multicast PDSCH, the device is configured with one of two modes including a first mode for reporting acknowledgement/negative-acknowledgement (ACK/NACK) and a second mode for reporting NACK only, and
    wherein the devices is configured with the second mode for the multicast PDSCH and, based on that first HARQ feedback information for the multicast PDSCH is to be multiplexed with second HARQ feedback information for the unicast PDSCH, the processor:
        generates the first HARQ feedback information based on the first mode other than the second mode configured for the device; and
        multiplexes the first HARQ feedback information generated based on the first mode, with the second HARQ feedback information.

12. The device of claim 11, wherein the device is an application-specific integrated circuit (ASIC) or a digital signal processor.

13. The device of claim 11, wherein the device is a user equipment (UE) operating in a 3rd generation partnership project (3GPP) based wireless communication system.

14. A method of receiving hybrid automatic repeat request (HARQ) feedback information by a base station (BS) in a wireless communication system, the method comprising:
- transmitting a plurality of physical downlink control channels (PDCCHs) each carrying downlink control information (DCI);
- transmitting a plurality of physical downlink shared channels (PDSCHs) based on the plurality of PDCCHs; and
- receiving from a user equipment (UE) a single uplink signal on which HARQ feedback information for each of the plurality of PDSCHs is multiplexed,
- wherein transmitting the plurality of PDCCHs comprises transmitting a first PDCCH carrying first DCI for multicast scheduling and transmitting a second PDCCH carrying second DCI for unicast scheduling,
- wherein transmitting the plurality of PDSCHs comprises transmitting a multicast PDSCH scheduled by the first DCI and transmitting a unicast PDSCH scheduled by the second DCI,
- wherein for the multicast PDSCH, the BS configures one of two modes including a first mode for receiving acknowledgement/negative-acknowledgement (ACK/NACK) and a second mode for receiving NACK only, and
- wherein the UE is configured with the second mode for the multicast PDSCH and, based on that first HARQ feedback information for the multicast PDSCH is to be multiplexed with second HARQ feedback information for the unicast PDSCH, the BS obtains the first HARQ feedback information and the second HARQ feedback information by assuming that the first HARQ feedback information is multiplexed with the second HARQ feedback information based on the first mode other than the second mode configured in the UE.

15. A base station (BS) for wireless communication, the BS comprising:
- a transceiver; and
- a processor configured to control the transceiver to:
- transmit a plurality of physical downlink control channels (PDCCHs), each carrying downlink control information (DCI);
- transmit a plurality of physical downlink shared channels (PDSCHs) based on the plurality of PDCCHs; and
- receive from a user equipment (UE) a single uplink signal on which HARQ feedback information for each of the plurality of PDSCHs is multiplexed,
- wherein transmitting the plurality of PDCCHs comprises transmitting a first PDCCH carrying first DCI for multicast scheduling and transmitting a second PDCCH carrying second DCI for unicast scheduling,
- wherein transmitting the plurality of PDSCHs comprises transmitting a multicast PDSCH scheduled by the first DCI and transmitting a unicast PDSCH scheduled by the second DCI,
- wherein for the multicast PDSCH, the processor configures-either one of two modes including a first mode for receiving acknowledgement/negative-acknowledgement (ACK/NACK) and a second mode for receiving NACK only, and
- wherein the UE is configured with the second mode for the multicast PDSCH and, based on that first HARQ feedback information for the multicast PDSCH is to be multiplexed with second HARQ feedback information for the unicast PDSCH, the processor obtains the first HARQ feedback information and the second HARQ feedback information by assuming that the first HARQ feedback information is multiplexed with the second HARQ feedback information based on the first mode other than the second mode configured in the UE.

* * * * *